United States Patent [19]

Favret, Jr.

[11] 4,428,841

[45] Jan. 31, 1984

[54] OFFSHORE POLLUTION PREVENTION

[75] Inventor: Uncas B. Favret, Jr., Covington, La.

[73] Assignee: Engineering Specialties, Inc., Covington, La.

[21] Appl. No.: 237,976

[22] Filed: Feb. 25, 1981

Related U.S. Application Data

[63] Continuation-in-part of Ser. No. 228,729, Jan. 27, 1981.

[51] Int. Cl.$^3$ .............................................. B01D 21/24
[52] U.S. Cl. .................................... 210/747; 210/802; 210/804; 210/170; 210/519; 210/522; 210/540
[58] Field of Search ............... 210/540, 747, 800, 804, 210/117, 120, 153, 170, 163, 519, 802, 521, 522

[56] References Cited

U.S. PATENT DOCUMENTS

| | | | |
|---|---|---|---|
| 386,114 | 7/1888 | Donahue | 210/522 |
| 612,791 | 10/1898 | Winkel . | |
| 758,484 | 4/1904 | Stewart | 210/521 |
| 801,679 | 10/1905 | Niclausse | 210/522 |
| 1,030,271 | 6/1912 | Arbuckle | 210/521 |
| 1,085,135 | 1/1914 | Kelly, Jr. . | |
| 1,127,137 | 2/1915 | West | 210/242 |
| 1,156,276 | 10/1915 | Darrow | 210/521 |
| 1,177,849 | 4/1916 | deKalb | 210/521 |
| 1,530,087 | 3/1925 | MacArthur | 210/521 |
| 1,654,839 | 1/1928 | Scoville | 210/521 |
| 1,709,676 | 4/1929 | Martyn | 210/521 |
| 1,946,414 | 2/1934 | Schmid . | |
| 1,984,431 | 12/1934 | Robertson | 209/159 |
| 2,014,431 | 9/1935 | Foster | 210/521 |
| 2,207,399 | 7/1940 | Gaertner | 210/521 |
| 2,261,101 | 10/1941 | Erwin | 210/522 |
| 2,595,838 | 5/1952 | Fuglie | 210/521 |
| 2,649,202 | 8/1953 | Jones | 209/159 |
| 2,793,186 | 5/1957 | Dunell et al. | 210/521 |
| 3,346,122 | 10/1967 | Cornelissen | 210/540 X |
| 3,375,930 | 4/1968 | Applebaum | 210/207 |
| 3,529,728 | 9/1970 | Middleberk et al. | 210/540 X |
| 3,578,216 | 5/1971 | Pearson | 222/195 |
| 3,666,108 | 5/1972 | Veld | 210/540 X |
| 3,666,111 | 5/1972 | Pielkenrood et al. | 210/521 |
| 3,666,112 | 5/1972 | Pielkenrood et al. | 210/521 |
| 3,837,501 | 9/1974 | Pielkenrood | 210/522 |
| 3,849,311 | 11/1974 | Jakubek | 210/188 |
| 3,886,064 | 5/1975 | Kosonen | 210/519 X |
| 3,893,918 | 7/1975 | Favret, Jr. | 210/104 X |
| 3,919,084 | 11/1975 | Bebech | 210/519 |
| 3,972,815 | 8/1976 | O'Cheskey et al. | 210/219 |
| 4,111,806 | 9/1978 | Wright et al. | 210/115 |
| 4,122,016 | 10/1978 | Tao et al. | 210/521 |
| 4,138,342 | 2/1979 | Middelbeek et al. | 210/522 |

OTHER PUBLICATIONS

Publication "Dissolved Air Flotation System", Bulletin 75-4, The Pielkenrood Separator Company.
Offshore Pollution Control Applications (Deck Drains, Produced Water, Sand Disposal), (undated).
Induced Air Flotation—High Performance Separators, (undated).
Monarch Separators, Inc., (undated).
How to Size Offshore Waste Water Separators, World Oil, 1968.
Revised Outer Continental Shelf Orders Governing Oil and Gas Base Operations (undated).
OCS Order No. 7 Pollution and Waste Disposal (undated).
Oil & Gas Journal, Separator Hydraulics-Tracer-Response Studies Can Pinpoint Separator Problems, 1977.

*Primary Examiner*—John Adee
*Attorney, Agent, or Firm*—Burns, Doane, Swecker & Mathis

[57] ABSTRACT

A complete system for removing oil from produced water and deck drain fluids in an offshore facility includes a surge settler which receives the produced water from a three-phase separator. In the surge settler, the produced water flows crosswise through a corrugated plate assembly to separate free oil and solids from the produced water. A portion of the produced water which is relatively free of solid particles (less than 50 microns) is then treated in a water washer with a portion which is relatively rich in solid particles further treated in a solids cleaner. In the water washer 90% or more oil droplets (less than 50 microns) is removed from the produced water and the relatively oil free water is then disposed by way of a skim pile. A portion of fluid from the water washer is further treated in a high efficiency skimmer. In the solids cleaner a conical corrugated plate arrangement having periodic agitation by sand cleaning eductors removes free oil from the solids rich portion of the fluid which is relatively rich in solid particles and passes a relatively oil free and solids rich portion to a skim pile for disposal. Drained fluids from exposed decks and elsewhere are supplied directly to the skim pile for oil removal prior to passage into the surrounding body of water.

26 Claims, 36 Drawing Figures

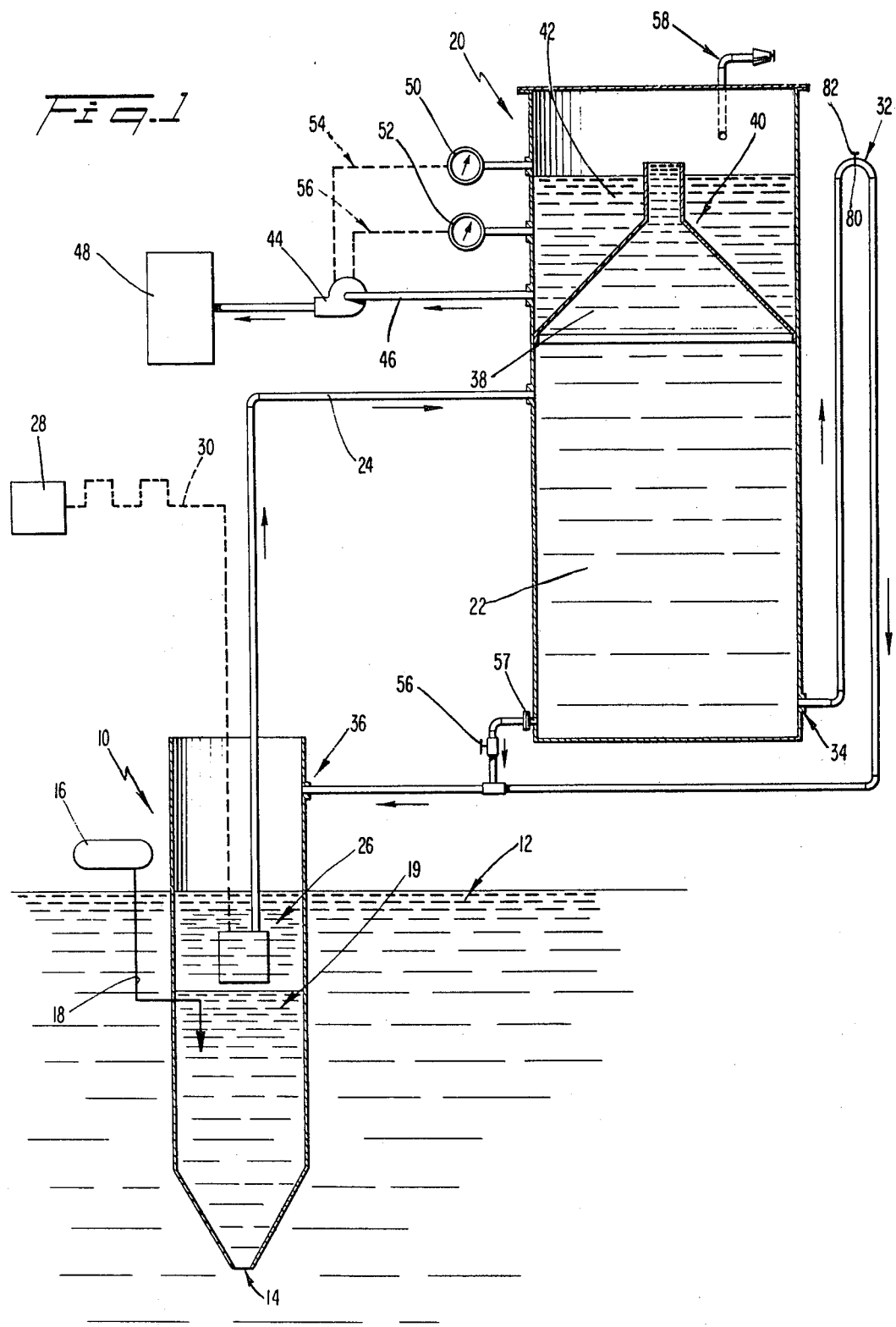

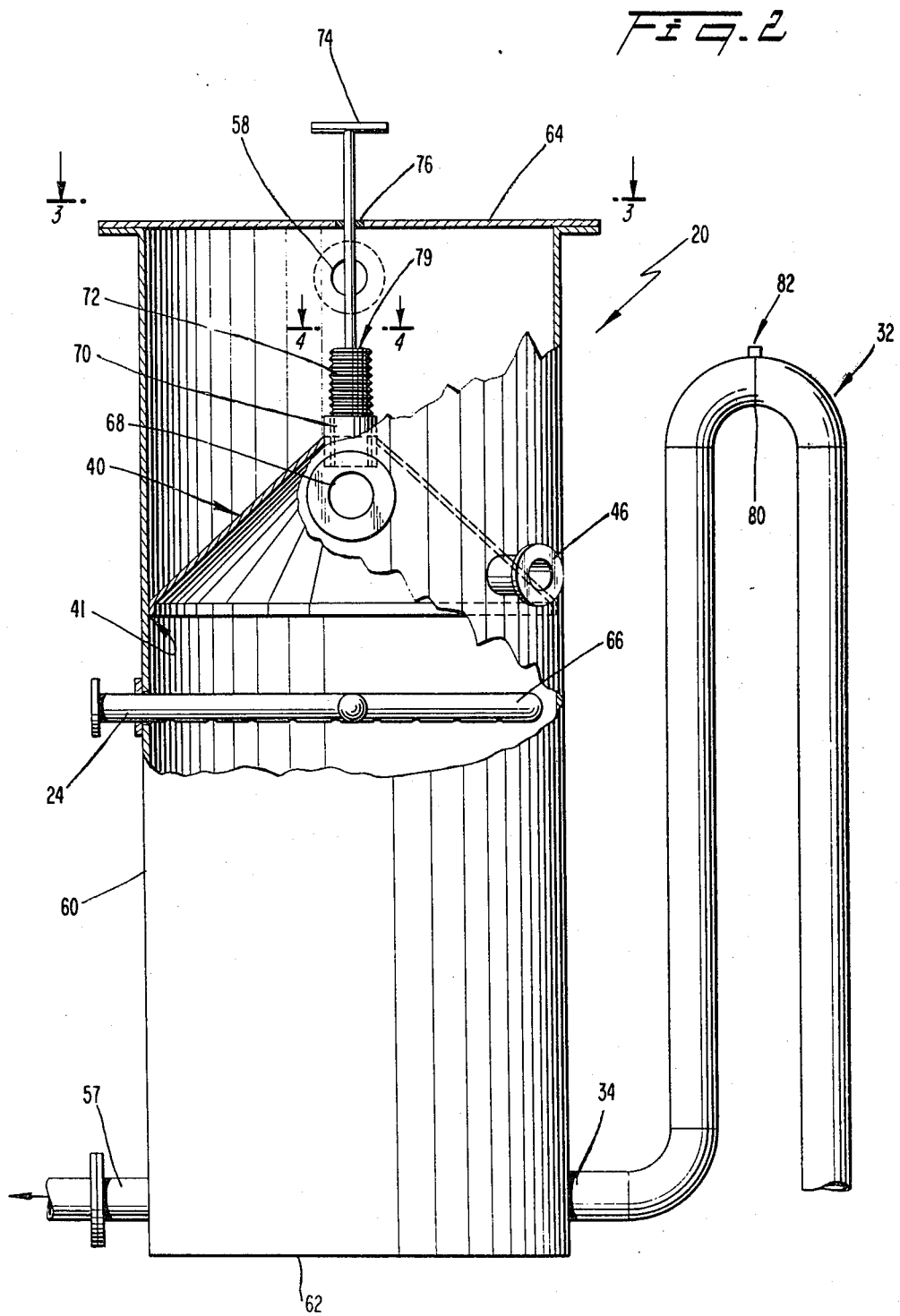

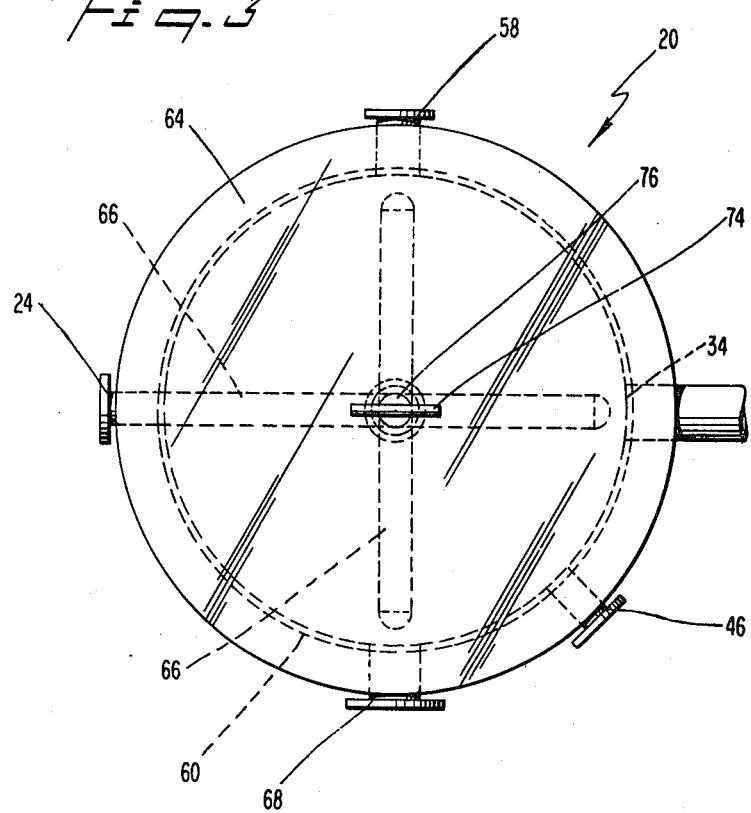
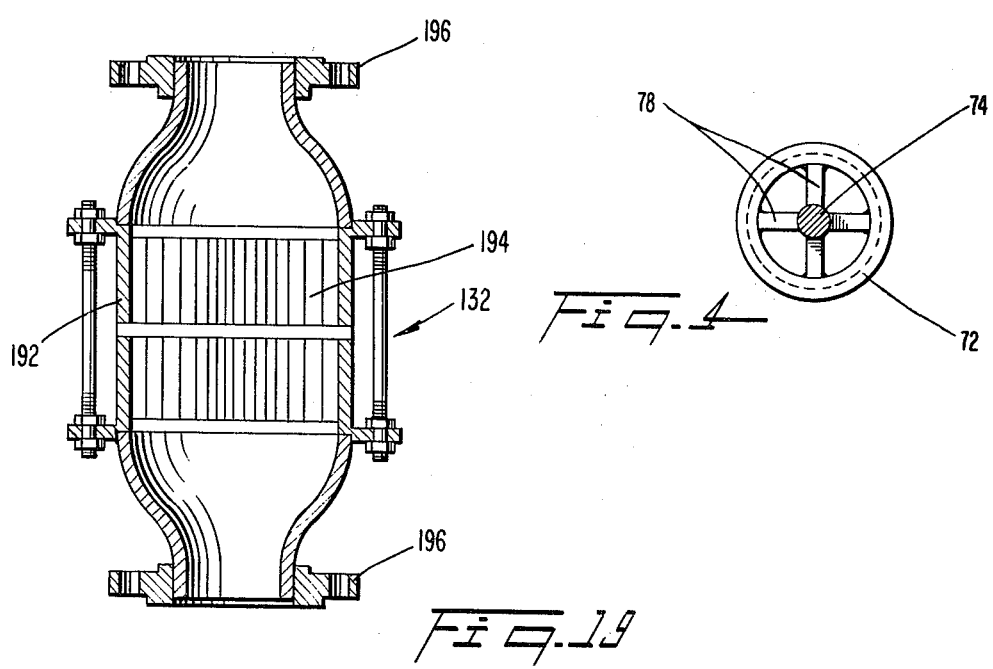

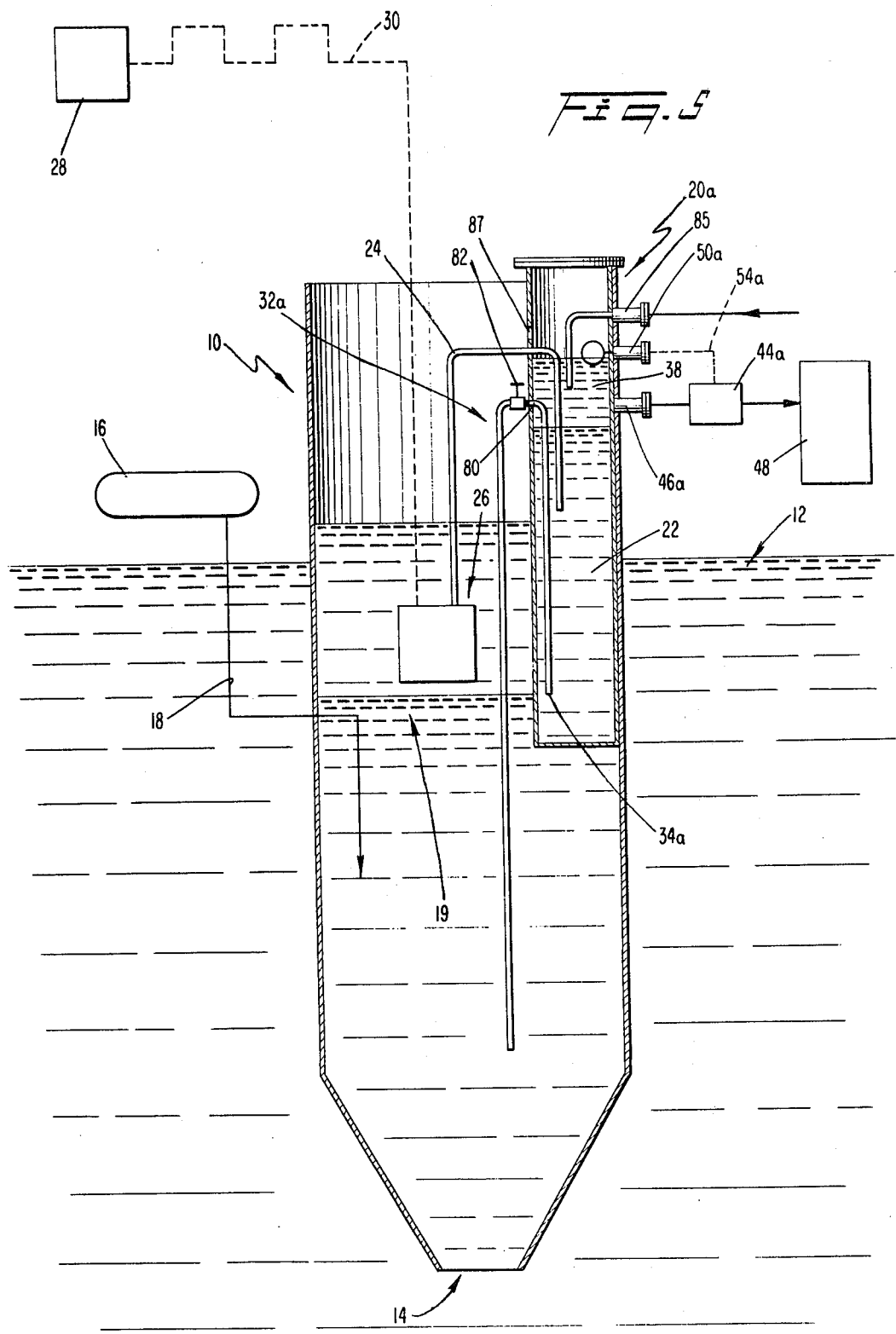

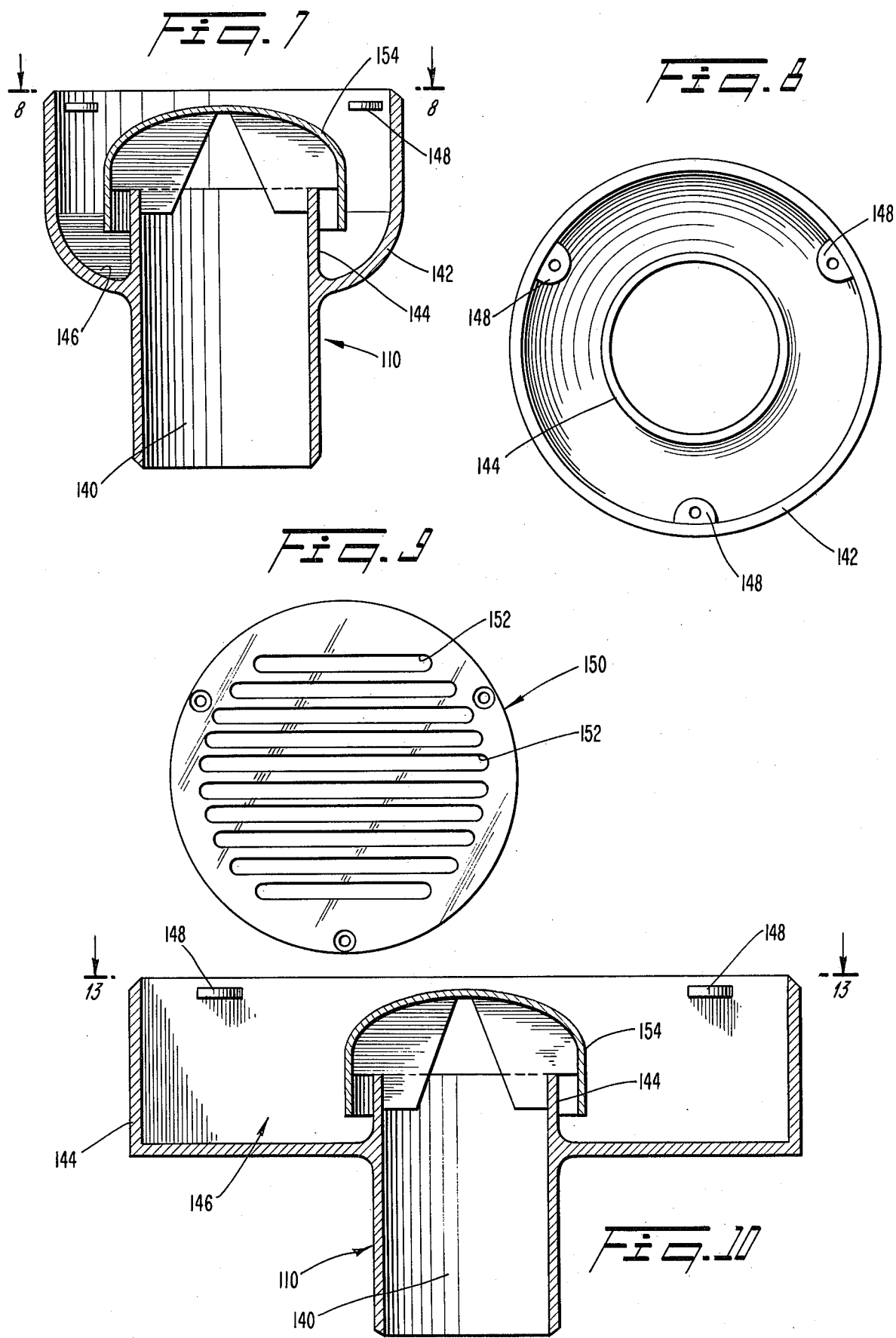

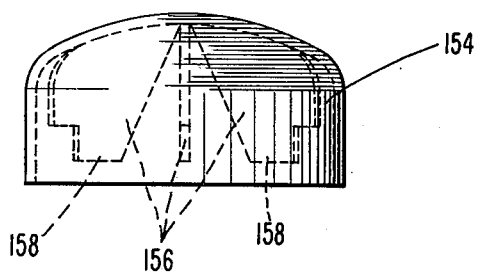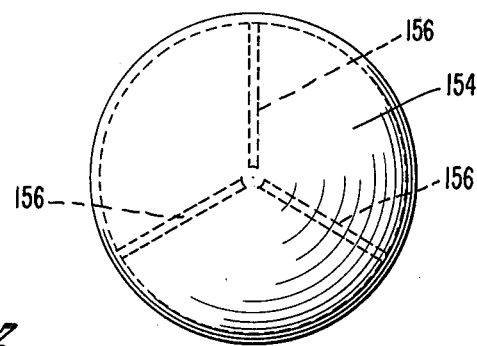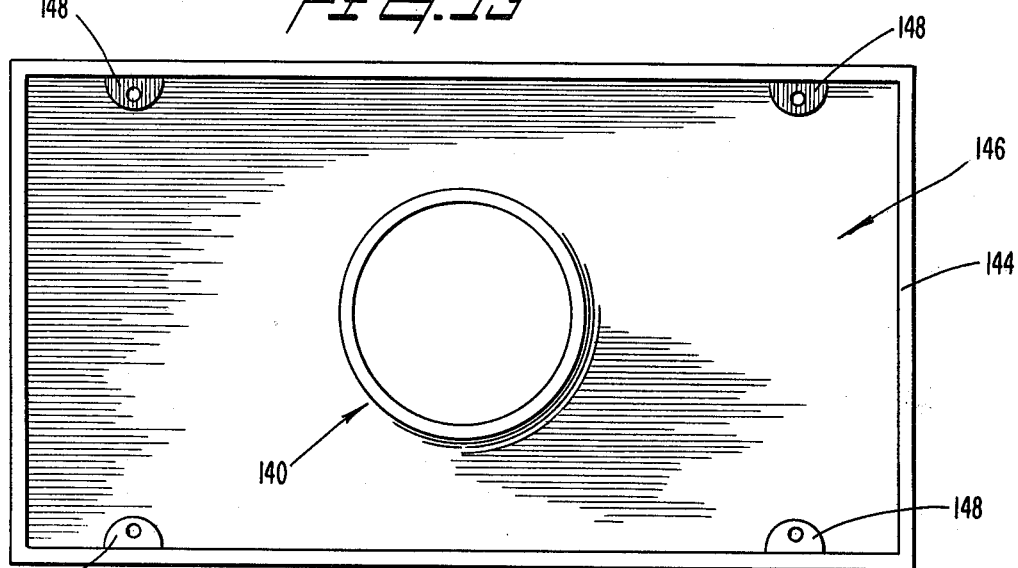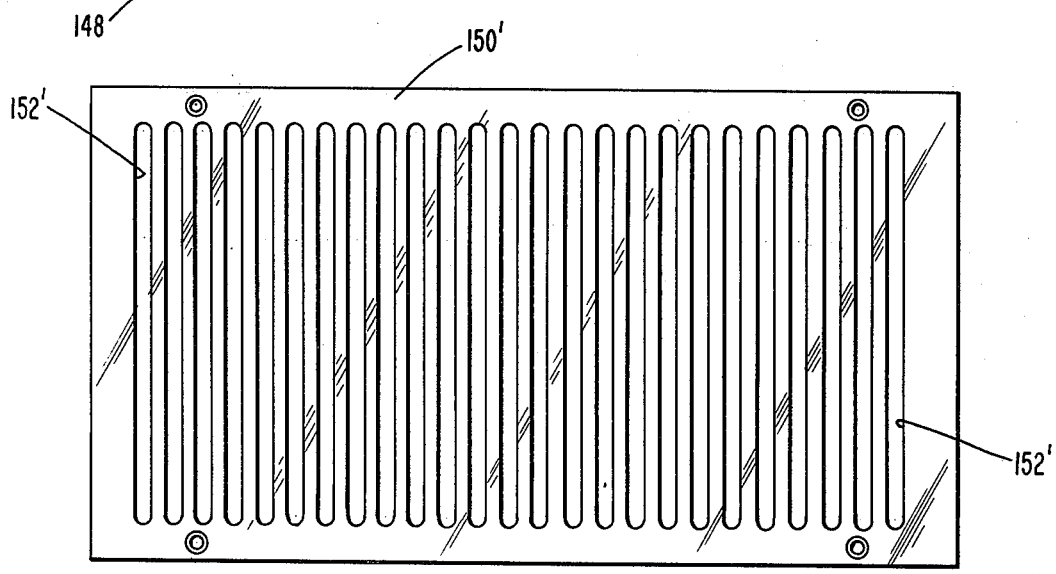

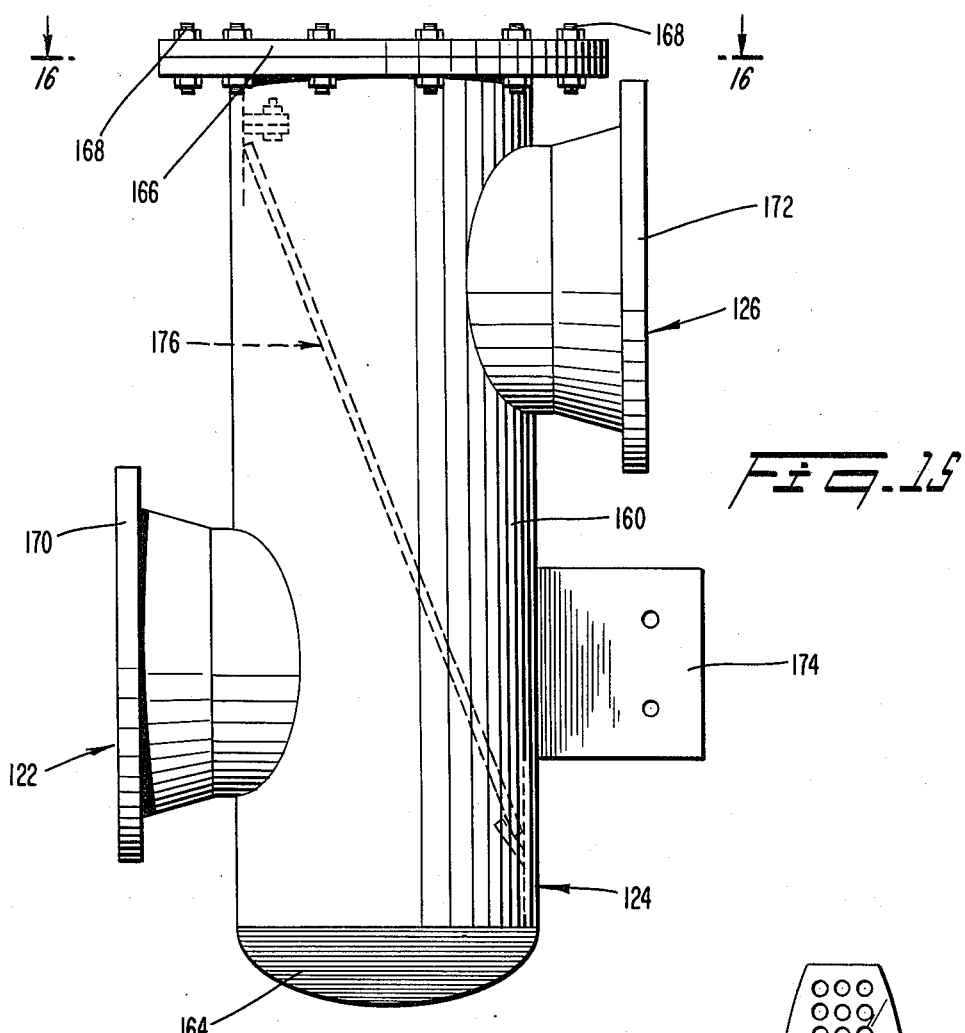
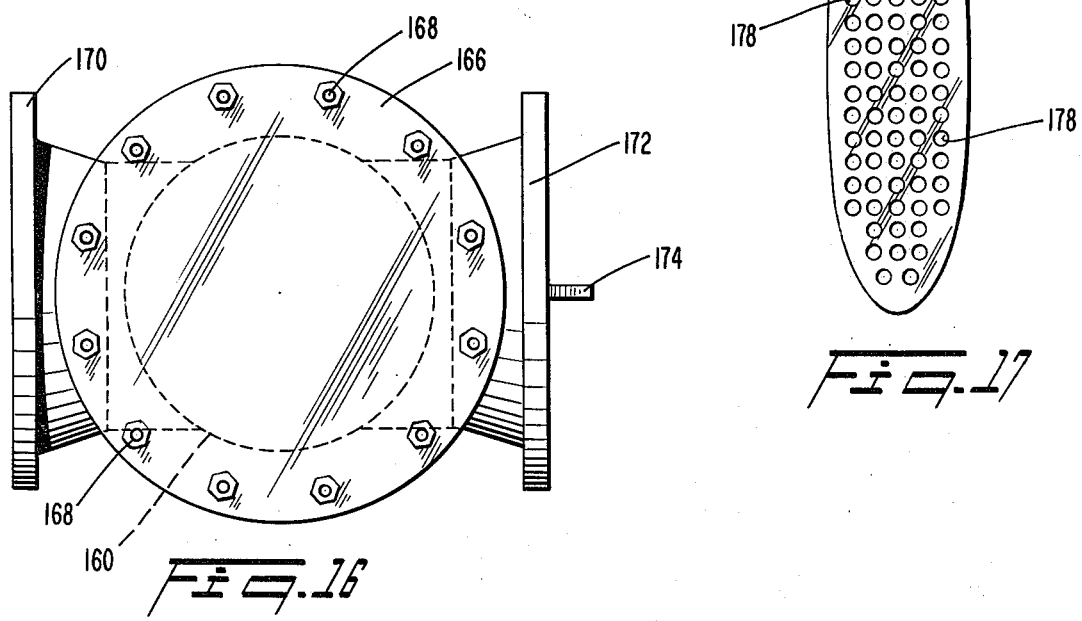

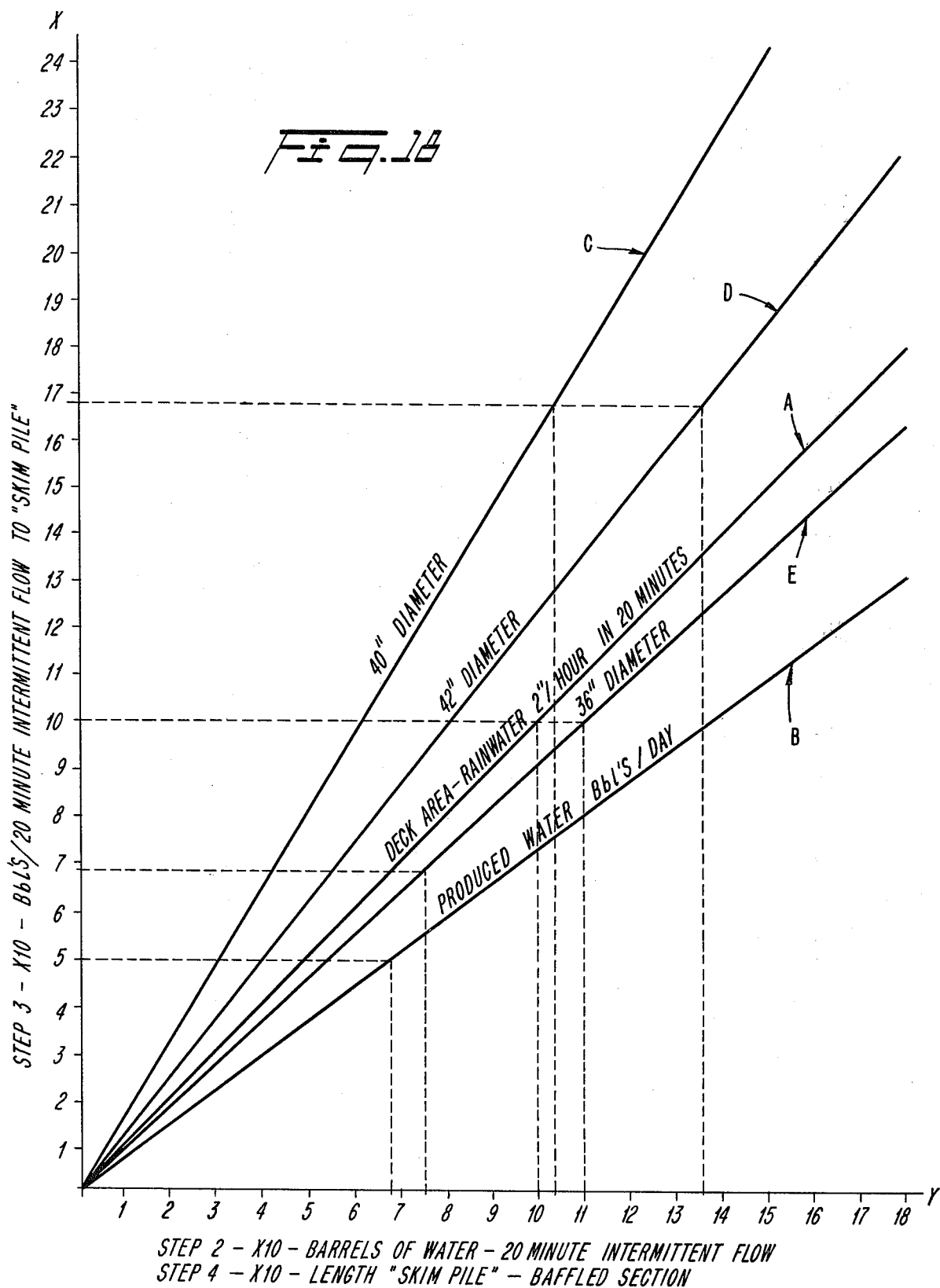

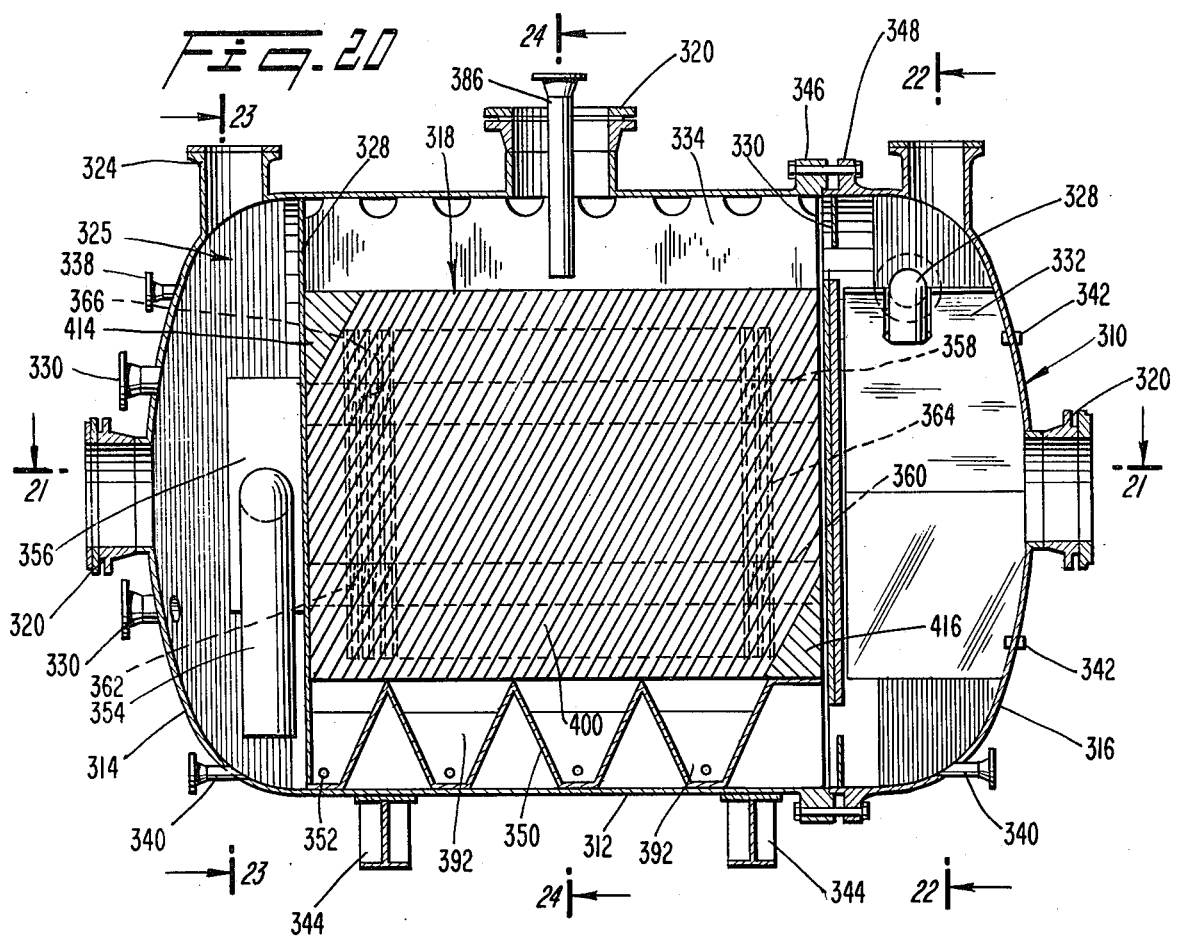
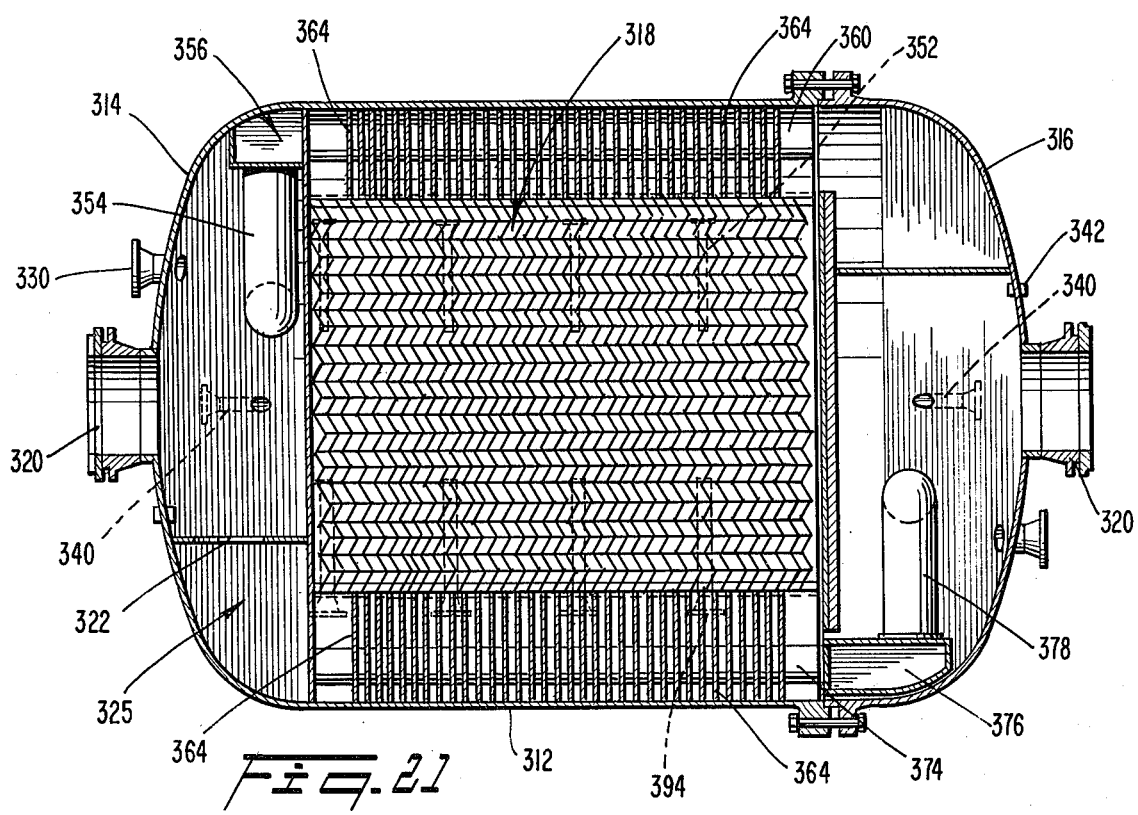

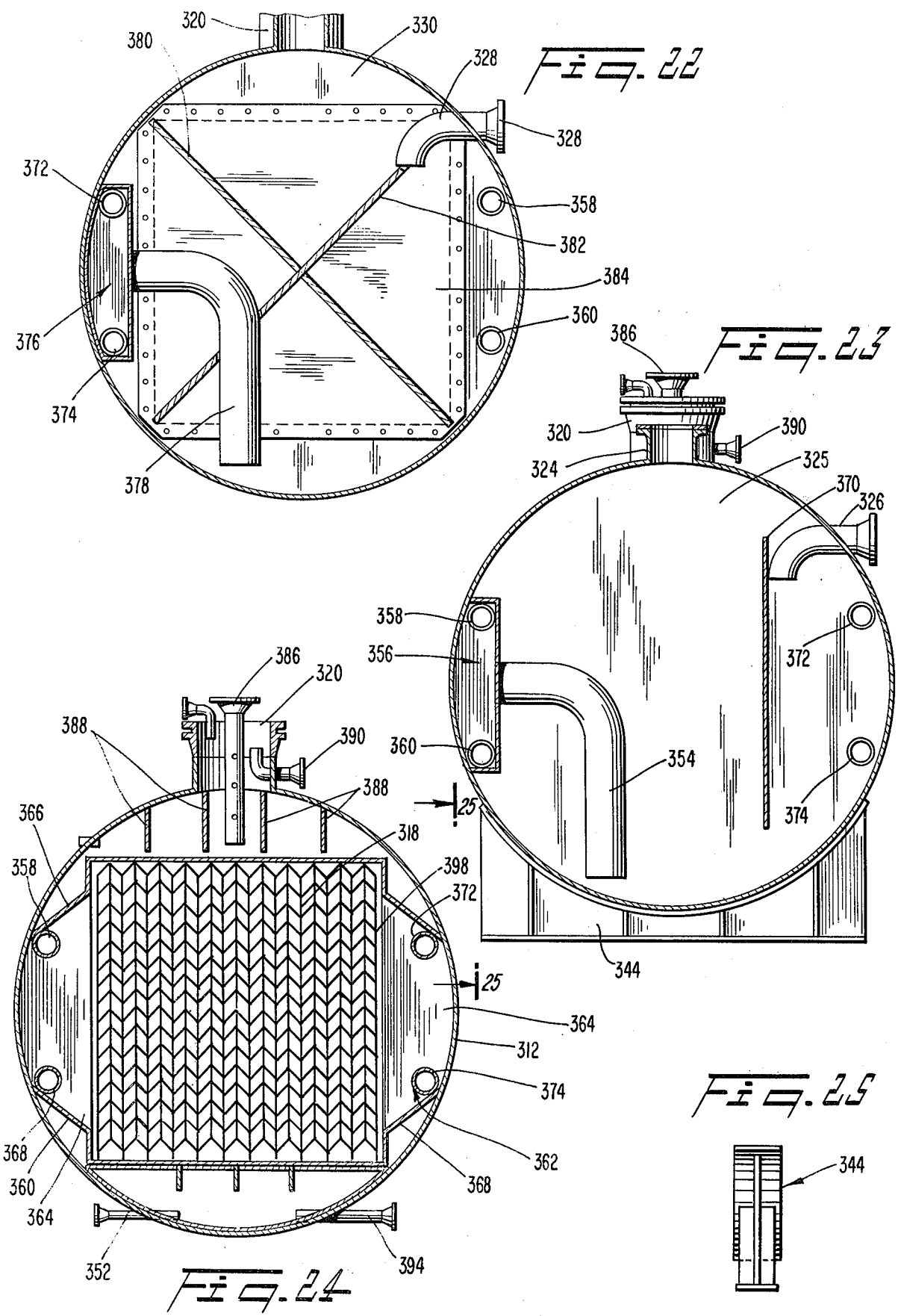

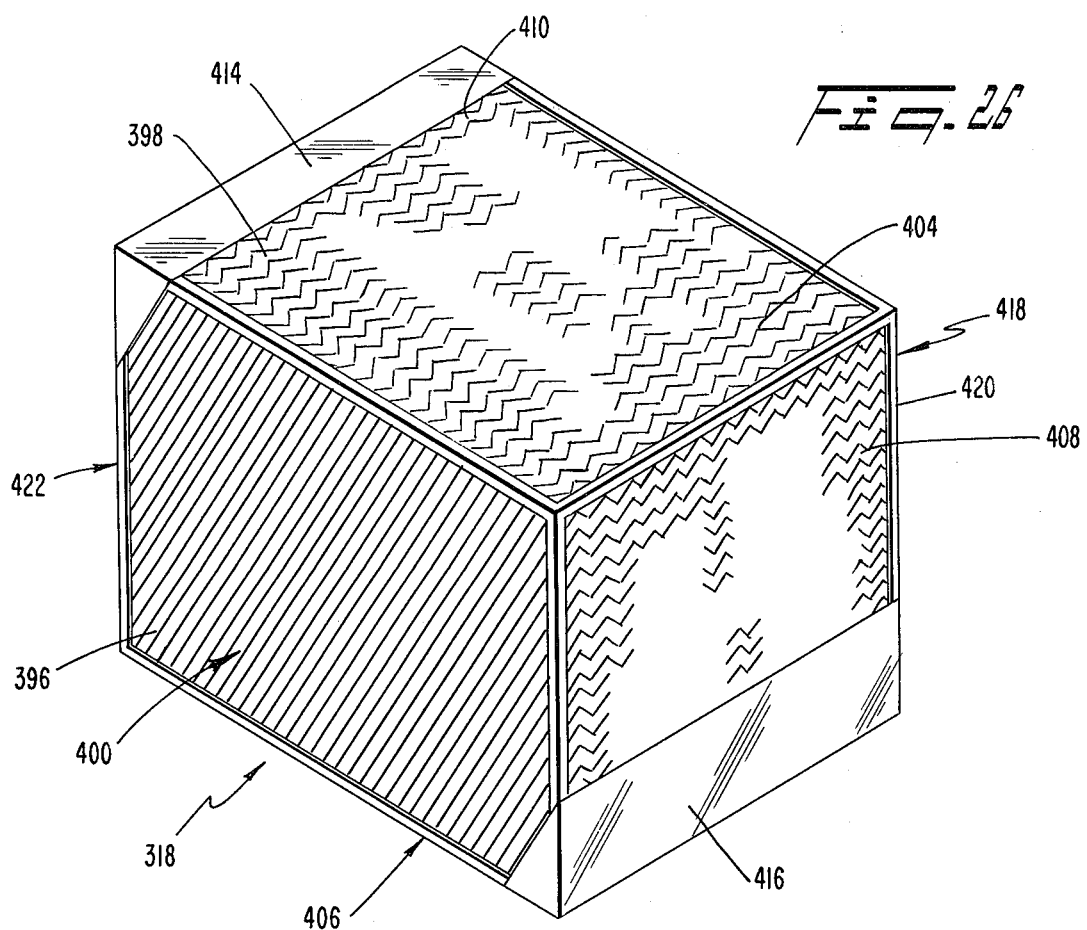
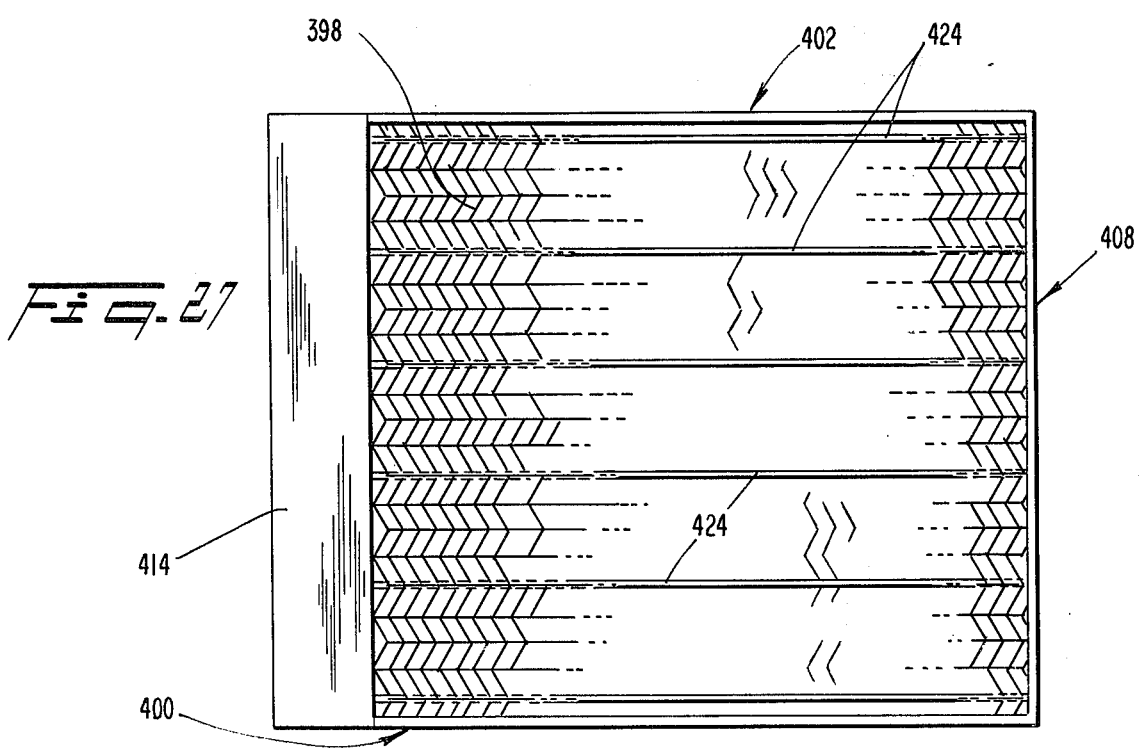

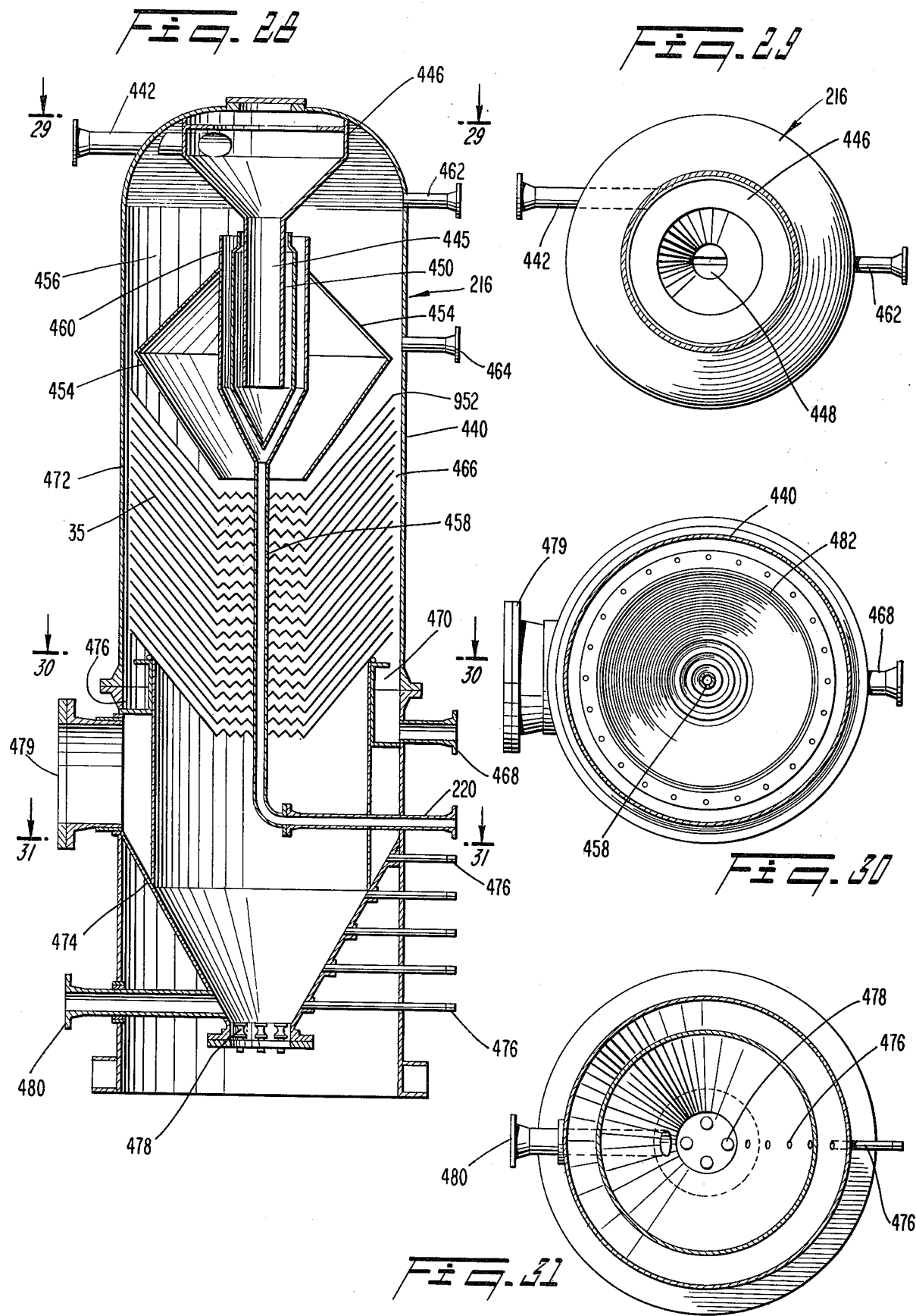

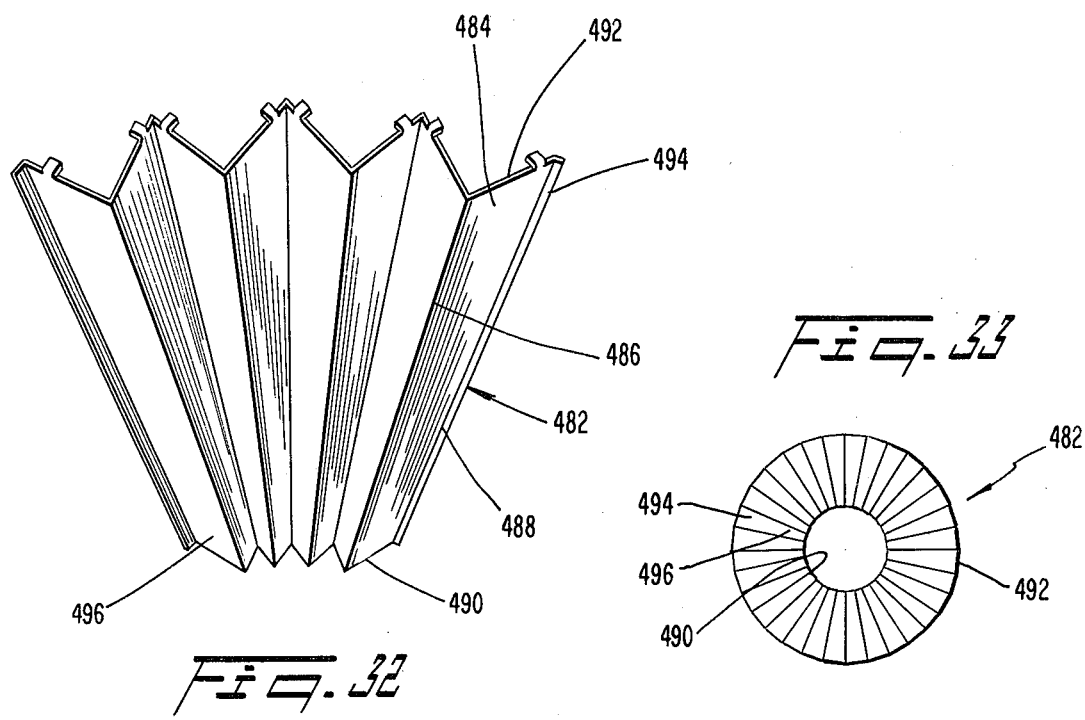
Fig. 32
Fig. 33
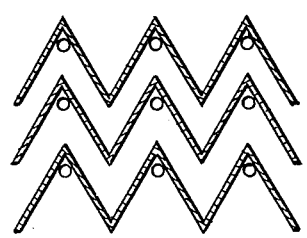
Fig. 35
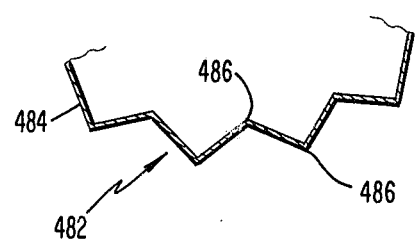
Fig. 34

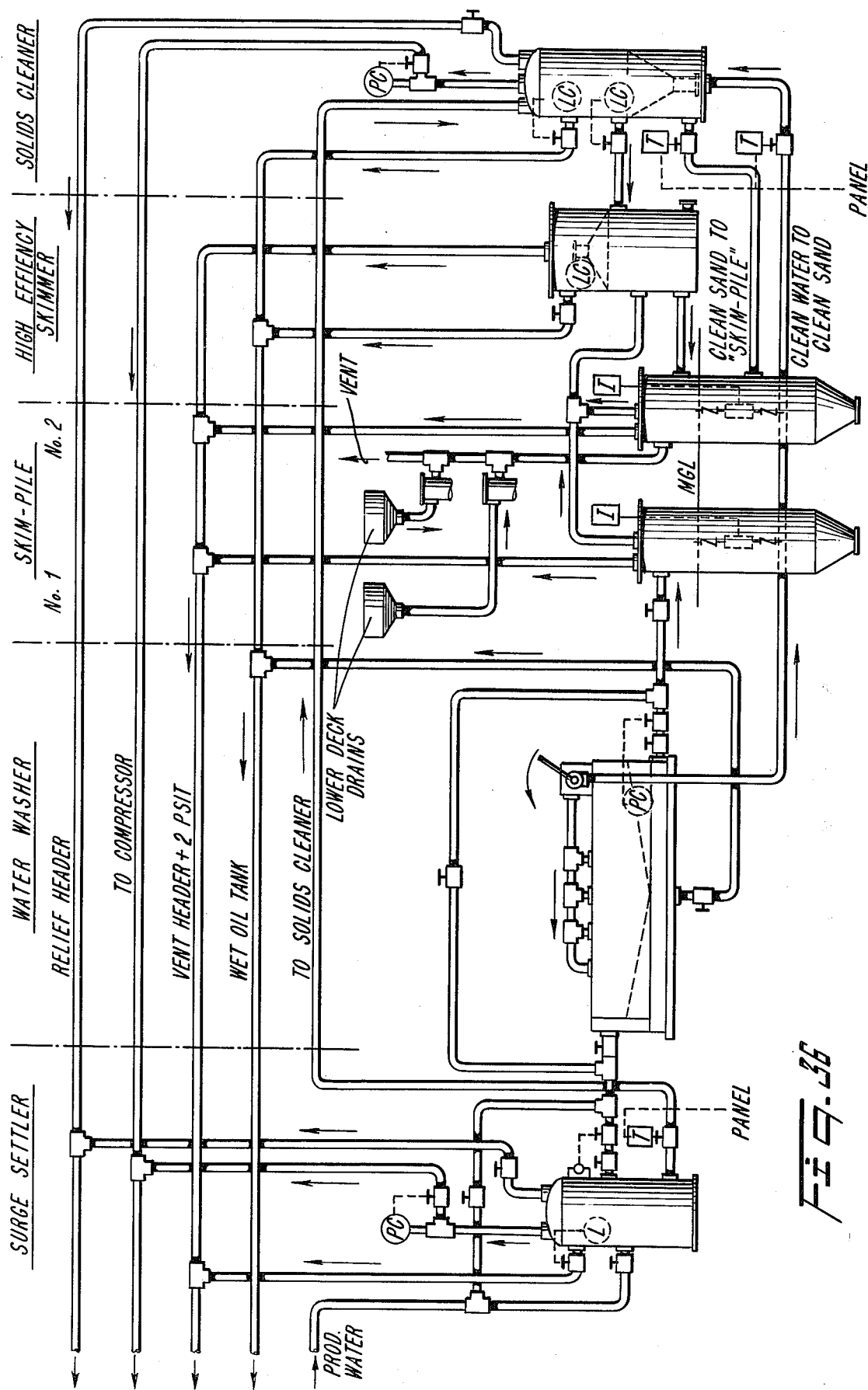

OFFSHORE POLLUTION PREVENTION

BACKGROUND OF THE INVENTION

This application is a continuation-in-part of my co-pending application Ser. No. 228,729 filed Jan. 27, 1981.

This invention relates to deck drainage and water pollution prevention in offshore oil platforms and the recovery of oil from an oil containing fluid mixture both collected by the deck drains and produced during oil and/or gas production. In particular, this invention relates to such deck drainage and oil recovery at an oil and/or gas processing facility located adjacent to a body of water, and to the disposal of the relatively oil-free fluid into the body of water.

It is conventional in oil and/or gas drilling and production to collect rainwater and miscellaneous fluids such as oils and greases for example from the decks of an offshore platform. Typically, a plurality of drains are arranged throughout one or more decks of the offshore platform, especially on portions of the decks which are open and therefore exposed to the weather. Since the rainwater washes any spilled oil or grease off of the deck and into the drains, the rainwater cannot be passed directly into the body of water beneath the platform (see for example OCS order No. 7 published in the Federal Register on May 18, 1979). Instead, the collected rainwater must be treated so as to separate the oil from the water until the percentage of oil in the water reaches an acceptable level. Typically, (as the governing country's ordinances permit) as little as 48 to 30 ppm of oil is permitted in the water to be returned to the body of water beneath the platform.

During operation of the oil and/or gas processing facility, it is conventional to pass the produced fluid through a three-phase separator to divide the fluid into gas, oil and produced water and solid particles (sand) components. The produced water, however, contains enough oil, oily sand and other contaminants sometimes to require further treatment of the produced water before being returned to the surrounding body of water. As with the collected rainwater, typically, as little as 48 to 30 ppm of oil is permitted in the water and solid particles (such as sand) to be returned to the body of water beneath the platform, according to OCS order No. 7.

Sometimes, the recovery of the oil present in the collected water from the drains and the produced water from the three-phase separator is economically worthwhile because of the value of the recovered oil. Both for pollution prevention and for economical reasons, it has been conventional to supply collected rainwater and oils from the decks of an offshore platform and the produced water from a three phase-separator to a "Skim Pile" (hereafter skim pile) or elongate separator conduit of Engineering Specialties, Inc., Covington, Louisiana such as is described in U.S. Pat. No. 3,893,918.

In U.S. Pat. No. 3,893,918, issued July 8, 1975, there are disclosed skim piles or elongate separator conduits that are useful and efficient in such recovery and disposal operations. The length of the conduit and the operating procedures are such that the rising velocity of the oil in the mixture results (during an intermittent flow procedure) in the establishment of a predictable upper oil layer in the conduit.

One of the skim piles disclosed in that patent operates while in continuous communication with the body of water. As such, the total fluid level in the skim pile is responsive to tidal changes in the mean level of the water body. Provision is made for withdrawing oil from the oil layer on top of the total fluid column in response to a sensing of the level of the interface between such oil layer and the remaining fluid column therebelow. In that fashion, one seeks to insure that only an oil rich mixture is withdrawn from the skim pile. Although that technique has proved quite acceptable, some difficulties have been encountered especially in situations where unpredictably large or erratic total fluid level changes are produced in response to changes in the mean level of the body of water.

U.S. Pat. No. 3,893,918 discloses a form of skim pile where the level of total fluid in the skim pile is basically isolated from changes in the mean level of the water body through the use of a valve weir. Problems associated with changes in that mean water level are thereby avoided. Such skim piles are normally employed only in shallow water situations where the underwater extent of the skim pile, if it were open at the bottom, would not normally be long enough to allow for adequate separation of oil (as governed by the sizing charts). This is because the terminal rising velocity of the oil would not sufficiently overcome the exit velocity of downward flow in the conduit (during the periods of intermittent flow). Although both open and closed skim piles could be employed in deeper water situations, operational and maintenance difficulties could become prominent by reason of the need to control a valve positioned at great depth for solids disposal.

In a conventionally known arrangement for collecting rainwater and oil containing liquids from one or more decks of an offshore platform, a liquid seal strainer is provided immediately upstream of the inlet of the skim pile with all of the deck drains supplying the collected fluids to the liquid seal strainer and then immediately into the skim pile.

Such an arrangement is objectionable, however, because the deck drains of different deck may be in communication with one another. Harmful gases which oftentimes accompany the collected rainwater and oil mixture from one deck coul then be transferred inadvertently to another deck.

In the known deck drain assemblies, no provision was made for removing the harmful gases from the drainage system but instead, both the liquid and gaseous components of the collected fluid were supplied to the skim pile. Since the skim pile is usually located lower than the deck drains, the gas must therefor be forced downwardly against gravity with the result that the gas could remain trapped in the drainage system in an undesirable manner.

Still further, since such gases which may be present in the collected rainwater and oil are very often highly flammable, the possibility of an explosion is ever present. Even though the skim pile is provided with a vent to atmosphere, the danger resulting from the harmful and flammable gases is increased since the gases are detained within the drainage system until they reach the skim pile and since the gases are passed perhaps from the top deck of the platform down to the boat deck of the platform where an explosion of the gas could likely result in damage both to the platform and to the crew.

In the conventionally known arrangements (having corrugated plate assemblies) for treating the produced water from a three-phase separator, unsatisfactory results are typically obtained because the same device is used for accomplishing significantly different tasks. For example, a device primarily designed to clean solid particles, such as sand, will of necessity be less effective at removing oil from water. This is because the conventional corrugated plate arrangement used to accomplish the cleaning or separation, typically favors one goal (such as free oil removal) over another (such as sand separation or cleaning). In the event that the equipment is designed so as not to favor any particular goal, equally unsatisfactory results will generally be obtained for each different function.

Furthermore, the known arrangements for treating the produced water from a three-phase separator may have been undesirable because they did not take advantage of the efficiencies which may be obtained by utilizing the force of gravity to assist rather than to inhibit the produced water treatment. By selective physical location of various components with respect to one another, a relatively compact yet effective treatment arrangement for produced water can be obtained.

In the present invention, the novel surge settler is of significant importance in reducing the level of solid particles in the produced water to an amount which can be accomodated by the water washer. Typically, this involves removing solid particles greater than 50 microns by the surge settler so that the water washer may remove 90-95% of the remaining oil (of droplet size about 50 microns or less) by a conventional gas flotation process.

Still further, the produced water contains different proportions and particle size of sand and oil depending upon the various conditions present at each particular offshore facility. For example, at some locations little or no sand is to be expected in the produced water while at other locations relatively large volumes of sand are likely to be present. When sand is expected, it may likely include particles primarily larger than 50 microns in diameter. Each of these different conditions is best accommodated by a produced water treatment facility which is configured to specifically accommodate the expected conditions.

OBJECTS AND SUMMARY OF PREFERRED FORMS OF THE INVENTION

It is a general object of the present invention to provide a complete deck drainage and produced water oil recovery method and apparatus that obviates or minimizes problems of the sort previously noted.

Another object of the present invention is to provide a novel, efficient method and apparatus for treating collected rainwater and produced water containing oil and for recovering oil from the oil containing fluids at an oil and/or gas processing offshore facility and disposing of the relatively oil-free fluid and solid particles into an adjacent body of water.

It is a particular object of the present invention to provide a novel apparatus and method for initially removing as a slurry a significant portion of the relatively large solid particles (greater than 50 microns) from the produced water of a three-phase separator.

Another object of the present invention is to provide a novel apparatus and method for subsequently cleaning the slurry forming the significant portion of the relatively large solid particles from the produced water.

Still another object of the present invention is to provide an apparatus and method for cleaning the slurry containing solid particles from the produced water having a vertical configuration to encourage particle flow.

Yet still another object of the present invention is to provide a total cleaning apparatus and method for produced water and for collected rainwater which includes a plurality of separate components which can be readily modified so as to accommodate particular characteristics expected at an installation site.

A preferred form of apparatus for treating an oil-containing fluid, for example, at an offshore facility according to the present invention includes a first plurality of drains which are arranged for collecting the oil-containing fluid from a deck of the offshore facility. A backflow of gas through a conduit is prevented by a liquid seal having an inlet and an outlet. The liquid seal is connected to the first plurality of drains by way of the conduit with the oil-containing fluid from the first plurality of drains passing through the seal. The oil containing fluid is then received for further handling or treatment for example by a skim pile such as is disclosed in U.S. Pat. No. 3,893,918. Between the liquid seal and the skim pile (or further treatment of the oil-containing fluid) is a vent in communication with the atmosphere for venting the oil-containing fluid with the vent communicating with the outlet of the liquid seal.

Preferably, however, the vent is provided with a flame arrestor so as to prevent an inadvertent ignition of the flammable gas leaving the vent from flashing back from the vent to the outlet of the liquid seal.

If the oil containing fluid is to be collected from more than one deck, the drains of a first deck are connected together in parallel with the liquid collected by the drains of the first deck passing through a first liquid seal. The first liquid seal preferably includes a strainer or another screen passageway arrangement so as to prevent soil material larger than a predetermined size from passing through the liquid seal strainer. Like the drains of the first deck, the drains of a second deck are connected in parallel so as to supply the collected fluid to a second liquid seal strainer with the first and second liquid seals supplying the collected fluid to a common passageway connected, for example, to a skim pile. Between the first and second liquid seal strainers and the skim pile, however, the conduit for supplying the fluid is provided with a vent to atmosphere and preferably also with a flame arrestor to prevent flashback.

Preferably, each of the drains of the one or more decks of the collection system is provided with a sealing arrangement so as to prevent a flow of gas back through the drain to the deck. These seals at the drain are preferably in addition to the liquid seal strainer which isolates the plurality of drains of, for example, an entire deck. In this way, it is necessary for both the liquid seal (strainer) and the seal of the particular deck drain to fail before harmful and flammable gas can back flow through the drainage system to the deck.

Preferably, the skim pile is arranged vertically lower than both the drains of each deck and the liquid seal strainer associated with the drains of each deck.

A preferred form of apparatus for treating produced water from a three-phase separator includes a novel Surge Settler (hereafter surge settler) of Engineering Specialties, Inc. which receives the produced water and removes 50 micron oil and solid particles. The produced water is passed through the preferred form of the surge settler by way of a first manifold formed by parallel plates to a corrugated plate assembly. A second manifold also formed by parallel plates is provided immediately downstream of the corrugated plate assembly with the produced water flowing crosswise from the first manifold through the corrugated plate assembly to the second manifold.

While passing through the corrugated plate assembly, oil within the produced water is liberated and rises above the corrugated plate assembly and solid particles liberated from the produced water are urged to pass downwardly beneath the corrugated plate assembly. Intermittently, the free oil is removed and the solid particles are flushed with water jets as a slurry into a conduit for further treatment.

After passing through the second manifold, the produced water can be preferably passed (depending upon the flow rate) to a water washer for further treatment.

The solid particle slurry (formed of sand, oil and water), separated from the produced water in the surge settler is preferably intermittently passed vertically downwardly to a Solids Cleaner (hereafter solids cleaner) of Engineering Specialties, Inc. In the solids cleaner, the material is passed downwardly into a central chamber having an array of generally conical corrugated plates oriented so as to point downwardly. The slurry is forced to flow initially downwardly to the inlet of the conical corrugated plates and then upwardly between adjacent ones of the conical corrugated plates. At this time, (and during subsequent periodic agitation of the slurry within the solids cleaner by sand cleaning eductors), oil is separated from the sand with the sand flowing countercurrent to the bottom of the solids cleaner. At an outlet of the conical corrugated plates, the separated oil flows upwardly to a collection chamber and the relatively clean water flows about the periphery of the generally conical corrugated plates.

The portion of the produced water from the surge settler which is relatively free of solid particles is passed to a conventional Water Washer (hereafter water washer) or dissolved gas flotation cell which removes about 90% or more of the oil of a droplet size about 50 microns or less in the produced water such as is supplied by U.S. Filter. Likewise, an oil rich fluid is separated from the produced water in the water washer. The produced water which is relatively oil free is passed directly to the skim pile for further oil removal or disposal before being released into the surrounding body of water. If desired, relatively clean water from the water washer may also be supplied to the solids cleaner to assist in the removal of oil from the slurry.

The relatively oil rich portion from the solids cleaner and from the water washer is preferably passed to a high efficiency skimmer for removing still further amounts of free oil from the water before being passed to the conventional skim pile. The relatively clean sand from the solids cleaner is preferably passed directly downward to the skim pile for final treatment and/or disposal before being passed into the surrounding body of water.

The skim pile thus receives both the collected rainwater and the treated produced water from a three phase separator. Depending upon the expected volume of produced water and rainwater along with the anticipated size and volume of solid particles, and the relative volume of oil, the various components can be proportionately sized and modified (or sometimes even eliminated) so as to provide an optimum and complete pollution prevention system for an oil/gas processing facility.

BRIEF DESCRIPTION OF THE DRAWINGS

Further details and advantages of preferred forms of the invention will become apparent from the subsequent detailed description, with reference to the accompanying drawings, where like reference characters indicate like elements, and in which:

FIG. 1 is a schematic elevational view of a preferred form of oil recovery apparatus;

FIG. 2 is an elevational view, partially in section, depicting a skimmer assembly in accordance with the preferred oil recovery apparatus of FIG. 1;

FIG. 3 is a top plan view of the skimmer assembly of FIG. 1;

FIG. 4 is a view along line 4—4 of FIG. 2;

FIG. 5 is a schematic elevational view similar to FIG. 1 but wherein the skimmer assembly is mounted within the skim pile.

FIG. 7 is a side cross sectional view of a preferred deck drain of FIG. 6;

FIG. 8 is a view through the line 8—8 of FIG. 7;

FIG. 9 is a top view of the coverplate of the deck drain of FIG. 7;

FIG. 10 is a side cross sectional view of an alternative deck drain of FIG. 6.

FIG. 11 is a side view of the cap of the deck drain of FIG. 7 and FIG. 10;

FIG. 12 is a top view of the cap of FIG. 11;

FIG. 13 is a view through the line 13—13 of FIG. 10;

FIG. 14 is a top view of the coverplate of the deck drain of FIG. 10;

FIG. 15 is a side view of the liquid seal strainer of FIG. 6;

FIG. 16 is a view through the line 16—16 of FIG. 15;

FIG. 17 is a top view of the strainer FIG. 15;

FIG. 18 is a graphical computation aid;

FIG. 19 is a side cross sectional view of a preferred flame arrestor of FIG. 6;

FIG. 20 is a side cross sectional view of a preferred embodiment of the surge settler of FIG. 6;

FIG. 21 is a view through the line 21—21 of FIG. 20;

FIG. 22 is a view through the line 22—22 of FIG. 20;

FIG. 23 is a view through the line 23—23 of FIG. 20;

FIG. 24 is a view through the line 24—24 of FIG. 20;

FIG. 25 is a view through the line 25—25 of FIG. 23;

FIG. 26 is a pictorial view of the corrugated plate arrangement of FIG. 20;

FIG. 27 is a top view of the corrugated plate arrangement of FIG. 26;

FIG. 28 is a side view of a preferred solids cleaner according to the present invention;

FIG. 29 is a view through the line 29—29 of FIG. 28;

FIG. 30 is a view through the line 30—30 of FIG. 28;

FIG. 31 is a view through the line 31—31 of FIG. 28;

FIG. 32 is a side view of a portion of a conical corrugated plate of FIG. 31;

FIG. 33 is a top view of a single conical corrugated plate;

FIG. 34 is a schematic view of the edge the portion of the conical corrugated plate of FIG. 31;

FIG. 35 is a view through the line 35—35 of FIG. 28;

FIG. 36 is a schematic diagram of a treatment system similar to that of FIG. 6;

DETAILED DESCRIPTION

Figure 6:
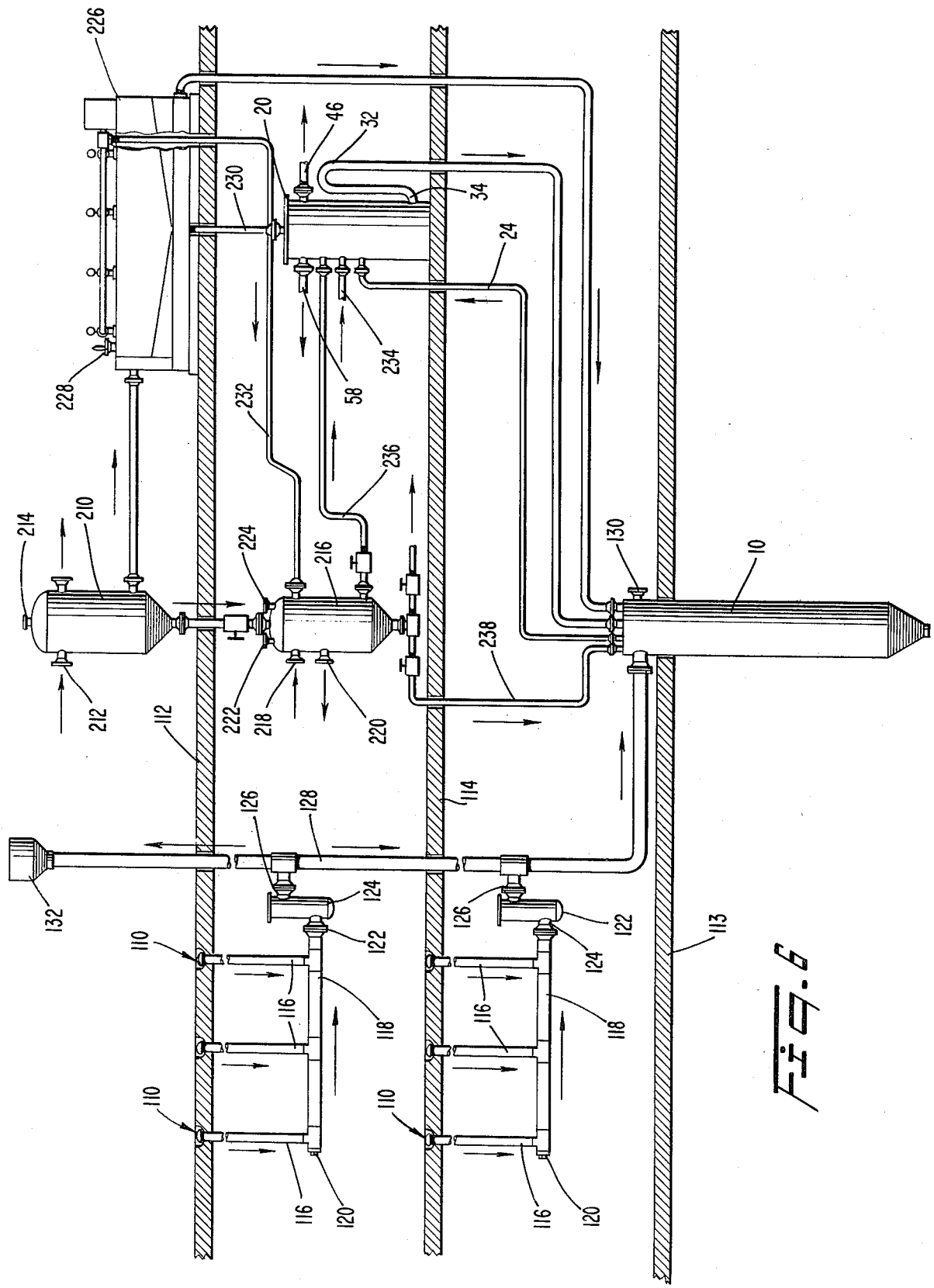
FIG. 6 is a side view in schematic form of a complete pollution prevention system for deck drainage and produced water in an offshore plateform facility according to the present invention.

From FIG. 1, one basic structure and method for recovering oil may be understood, which structure and method is disclosed and claimed in applicant's earlier application Ser. No. 83,278 filed on Oct. 10, 1979 (now U.S. Pat. No. 4,252,649) which is a continuation-in-part of application Ser. No. 15,468 filed on Feb. 26, 1979. Both U.S. Pat. No. 4,252,649 and application Ser. No. 15,468 are hereby incorporated by reference.

An elongate, open bottom separator conduit, or skim pile 10 is disposed in a generally upwardly extending posture in a body of water 12 adjacent an oil and/or gas production facility. The open bottom 14 of the skim pile establishes an exit zone in continuous communication with the water body.

An oil containing fluid mixture is supplied to the skim pile 10 from a suitable source 16, through supply conduits, schematically indicated at 18. The mixture so supplied may eminate from skid drains or other sources associated, for example, with an offshore drilling and/or production operation. In any event, the manner of supply of the mixture is sufficient to permit oil to rise to the upper region 19 of the fluid column within the skim pile 10. This establishes an upper layer of oil on that fluid column.

Preferably the structure of the open ended skim pile 10 and the fluid mixture supply equipment associated therewith, as well as the operation thereof, is essentially identical to that described in U.S. Pat. No. 3,893,918, the disclosure of which is hereby incorporated by reference. It will, however, be appreciated that other forms of separator conduits and other operational techniques may be employed, while still realizing the benefits of the present invention.

The skim pile 10 is interconnected with a settling tank assembly or skimmer vessel 20 (preferably the High Efficiency Skimmer Vessel of Engineering Specialties, Inc.), where a head of fluid 22 is established and maintained at a level independent of the level of the water body 12. Any convenient location for the settling tank assembly 20 will suffice, for example, on a drilling and/or production platform (not shown in FIG. 1 but see also FIG. 6) where the source fluid supplied to the skim pile 10 eminates. Alternatively, the settling tank assembly 20 may be suspended from or mounted on the portion of the skim pile 10 which projects well above the water body 12. As will also become apparent, the settling tank assembly or skimmer vessel 20 may even be mounted within the skim pile 12 (see FIG. 5).

Fluid is intermittently transferred from the upper region 19 of the skim pile 10 to the isolated head of fluid 22 in the settling tank assembly 20. In this connection, a transfer conduit is schematically depicted at 24 in FIG. 1. The inlet to the transfer conduit 24 is connected to a pump or blowcase 26 disposed in the fluid at the upper region 19 of the skim pile.

At many, if not most, times the fluid in this upper region will consist by and large of relatively pure oil. An interface control system, such as the one described in the previously incorporated disclosure of U.S. Pat. No. 3,893,918, may even be employed to help insure that this is the case. If, however, transfer occurs at times of large or erratic total fluid level changes in the skim pile 10 (in response to changes in the mean level of the water body 12), the fluid so transferred would not be entirely suitable for immediate recovery.

The use of the interconnected settling tank assembly 20 remedies that problem without any need for concern over the accuracy or reliability of an interface control. In fact such control may, if desired, be dispensed with; and transfer of fluid to the settling tank assembly may be accomplished at intervals in any suitable manner. For example, a suitable time based intermitter 28, with or without manual override, may be used to provide a suitable control signal 30 to the pump or blowcase 26.

When a pump initiates the transfer to the skimmer vessel 20, suction from the pump withdraws the fluid from the upper region 19 of the skim pile 10. When a blowcase is used, pressure is the initiating transfer force. In this regard, a blowcase basically comprises a tube with inlet and outlet check valves. Fluid flows into the tube through the inlet check valve until the tube is filled, at which time the pressure of the internal fluid holds one check valve closed. A supply of external pressure to the outlet check valve serves to open the outlet and blow out the contents of the tube, while at the same time forcing the inlet check valve closed, all in a manner which will be readily appreciated by those skilled in the art.

The overall level of fluid in the skimmer vessel 20 depicted in FIG. 1 is maintained by a level control weir assembly schematically indicated at 32. This weir assembly 32 is essentially a generally U-shaped tube disposed in a generally vertical position. Its inlet is connected to the lower end of the settling tank, as indicated at 34, and its outlet is connected to the skim pile, as indicated at 36. Thus, when fluid is transferred to the settling tank, excess fluid above the level maintained by the weir refluxes back to the skim pile.

In this connection, the inlet 34 to the level control weir 32 is disposed at the lower end of the skimmer vessel so that the most relatively oil-free fluid is refluxed, while the oil-rich fluid remains to undergo separation within the skimmer vessel during periods when the total fluid therewithin is basically at rest. This oil rises toward the top of the skimmer vessel to establish an upper oil layer 38 therewithin.

This upper oil layer 38 is surrounded by an open-ended, generally conical barrier 40 that forms a portion of the skimmer vessel and establishes a separating weir. In a manner more fully described below, rising oil spills over the separating weir 40, and the spillover oil 42 is isolated from the established head of fluid 22.

The isolated oil so recovered may be transported to any desired location in any suitable manner. For example, a pump 44 may be employed to withdraw oil through an outlet conduit 46 and deliver the oil into the main system 48 associated with the oil handling facility.

Preferably, withdrawal of oil by the pump 44 is controlled through conventional high and low level sensors 50 and 52. These sensors communicate with the zone reserved for spillover oil 42 and provide initiation and termination signals 54 and 56 to the pump 44.

Solids such as sand which deposit at the bottom of the skimmer vessel may also be removed and refluxed. For this purpose a valve 56, located at the bottom of the skimmer vessel, permits emptying of the solids into the conduit which carries the reflux fluid that exits through the level control weir 32. The valve may be manually operated or automatically controlled in any suitable manner.

While the settling tank assembly or skimmer vessel 20 heretofore described employs the level control weir 32 to maintain fluid level and to permit reflux, it will be appreciated that other structures may be alternatively utilized. In this regard, the level control weir 32 may be dispensed with and both the fluid level of the settling tank and refluxing may be entirely controlled by the valved outlet 56 from the bottom of the tank which directly feeds back to the skim pile 10. Of course, this arrangement would necessitate insuring that the valve 56 is controlled in a manner which would avoid overfilling the skimmer vessel, and the atmospheric vent 58 shown in FIG. 1 would be deleted. The separating weir 40 could, however, be retained.

FIGS. 2-4 depict further details of the separating weir 40 as well as other portions of the skimmer vessel 20.

The basic skimmer vessel structure is comprised of a generally cylindrical vessel 60 with a closed bottom 62 and a cover plate 64. All fluid transfer to and from the vessel 60 occurs through the cylindrical sidewall.

The transfer conduit 24 which brings fluid from the skim pile terminates in a distribution header 66 internally of the vessel at a level slightly beneath the separating weir 40. The vessel outlet which constitutes the inlet 34 to the level control weir 32 is located near the bottom of the vessel, as is a fitting 57 for the valved outlet 56.

Slightly above the level at which the conical separating weir 40 joins the cylindrical sidewall 60 to which it is welded (as indicated at 41), the outlet 46 for the spillover oil is located. Thereabove, a fitting 68 associated with the high and low level spillover oil sensors 50 and 52 (not shown in FIG. 2) is positioned. Near the top of the vessel 60, the atmospheric vent 58 is disposed.

The uppermost open end of the conical weir 40 includes a cylindrical sleeve 70 which is internally threaded. Adjustably threadably received within the sleeve is an externally threaded, open-ended tube 72 which forms a continuation of the weir.

Adjustment of the tube 72 is accomplished by the turning of a T-shaped bar 74 that projects into the vessel 60 through a packing gland 76 in the cover plate 64. The lower end of the bar 74 is welded to a cross web assembly 78 located internally of the tube 72 (see FIG. 4). As will be appreciated, through adjustment of the sleeve, the level at which spillover occurs can be finely adjusted.

In operation, the level control weir 32 maintains an established level of fluid in the vessel 60 and provides for refluxing of excess fluid. Siphoning of the vessel contents is prevented by a siphon breaker 82 of conventional construction which is located at the curved or transition section 80 of the level control weir.

Oil within the vessel 60 rises toward the top where it forms a layer. The conical separating weir 40 restricts the upper oil layer and tends to maximize the height thereof for a given volume. Thus, an oil rich top portion of the layer is insured and the oil-water interface is reduced to further minimize the possibility of water contamination.

The adjustable tube 72 which forms a continuation of the separating weir 40 allows for adjustment of the height at which spillover occurs. Because of the manometer effect resulting from the interconnection between the vessel 60 and the level control weir 32, the level inside the vessel 60 will tend toward a height greater than the fluid level in the level control weir 32 (see FIG. 1). This is because the density of the oil at the top of the fluid in the vessel 60 is less than the density of the fluid in the level control weir. Thus, the resulting force balance required in the manometer effect cannot take place unless the total fluid in the vessel (including the lighter upper oil layer) is higher than the fluid in the level control weir 32 when the system is at rest.

Therefore, if the outlet 79 (see FIG. 2) of the adjustable tube 72 is maintained slightly above the high point of the level control weir 32, the manometer effect will produce spillover. Of course, spillover could occur if the outlet 79 is located below the high point of the level control weir 32, but this could ultimately result in water spilling over.

Accordingly, the outlet 79 is adjustable within limits between the low point of the transition section 80 of the level control weir and a location slightly above the high point of that transition section 80. In intermediate positions the natural spillover from the manometer effect will take place, as will a forced spillover that results from fluctuations in fluid level in the level control weir, which fluctuations are produced between times of refluxing and times of rest.

In the embodiment of the invention depicted in FIG. 5, a skimmer assembly 20a is physically mounted within the skim pile 10. For ultimate oil withdrawal by a pump 44a a conduit 46a also thus passes through the skim pile sidewall. If desired, some relatively oil-rich fluid which is to undergo separation may be introduced directly into the skimmer assembly 20a from some suitable source through a conduit indicated at 85.

Generally, the skimmer assembly 20a is similar in structure and function to the skimmer vessel 20 already described, and further detailed description is unnecessary. However, it should be noted that the separating weir has not been illustrated in conjunction with FIG. 5. Although it may be employed, if desired, it is not normally quite as justified where, as in the case of FIG. 5, the skimmer assembly 20a is itself conveniently structured with a greater length and a smaller diameter that aids in producing a relatively deep oil layer 38 at the top of the fluid column 22.

It will also be apparent that the level control weir 32a is depicted as having at least one leg physically within the skimmer vessel 20a. Nevertheless its function is similar to that of the level control weir 32 previously described in that it establishes and maintains a desired total fluid level and refluxes excess fluid. In this latter connection, the inlet 34a to the weir 32a is disposed near the bottom of the skimmer assembly so that fluid with the least amount of oil is to be refluxed. The siphon breaker 82, of course, prevents emptying of the skimmer vessel contents below the desired level.

Because of the relatively small diameter of the skimmer vessel 20a the system hydraulics are such that the upper oil layer 38 of total fluid will normally extend considerably above the uppermost transition section 80 of the level control weir 32a. A high level oil spillover opening 82 may be provided in the skimmer vessel so that if the level gets too high, oil will spillover into the basically oil-rich layer 19 in the skim pile 10.

Withdrawal of oil from the skimmer assembly 20a by the pump 44a may be controlled by any suitable level control device 50a disposed at which provides appropriate control signals 54a.

With reference now to FIG. 6, a deck drain assembly for collecting rain water and oil containing fluid for example at an offshore oil and/or gas production facility includes a plurality of deck drains 110 arranged variously about one or more decks of the facility. Typically, a plurality of deck drains are provided about portions of a top deck 112 which are exposed to rain or other sources of water. Similarly, a cellar deck 114 of the offshore facility is typically provided with a plurality of deck drains 110 arranged both in exposed portions of the cellar deck and also perhaps at interior portions of the cellar deck where an accumulation of water is expected.

Each of the deck drains 110 of each deck, is in fluid communication with a down spout 116 which empties into a generally horizontal conduit system 118. Preferably, the plurality of down spouts 116 of each deck are connected in parallel to the respective horizontal passageway 118 with the horizontal passageway 118 having a sufficient inclination so as to drain the fluid from the connected down spouts 116. As desired, a clean out port 120 may be provided at an end of each horizontal passageway 118 so as to permit the periodic cleaning of the passageway and the removal of obstructions which may occur in the passageway 118.

It is expected that the down spouts 116 may be provided with a diameter of about 4 inches and that the generally horizontal passageway 118 should have a drop of about one inch for each 10 feet of horizontal extent to provide a sufficient inclination. The down spout or vent stack 128 preferably has an 8 inch diameter and extends well above the top deck of the facility.

Each of the horizontal passageways 118 is connected to an inlet 122 of a liquid seal strainer 124 (see also FIG. 15). The liquid seal strainer has an outlet 126 which is vertically higher than the inlet 122 with the result that the liquid seal strainer and the horizontal passageway 118 are generally completely filled with liquid up to the level of the outlet 126. Depending upon the inclination of the passageway 118, either the entire passageway 118 or only a portion of the passageway 118 may be supplied with liquid at any particular time. The outlet 126 of each of the liquid seal strainers communicates with a stack pipe 128 to supply the collected drain water and oil-containing fluids to a skim pile 10 as discussed above.

In the skim pile 10, the collected rain water and oil-containing fluid is separated into oil and relatively clean water along with the liberation of gas provided within the fluid. The gas vents to atmosphere from the skim pile through a vent 130 which may include a flame arrestor (not shown) with the recovered oil conveyed to the high efficiency skimmer vessel through the conduit at 24 (see FIG. 1). The relatively clean water is returned from the high efficiency skimmer vessel 20 from the outlet 34 to the inlet of the skim pile 36 by way of the passageway 32.

The vent stack 128 is provided with a flame arrestor 132 at an outlet of the vent stack 128 which permits a gaseous portion of the fluid collected by the deck drains 110 and passed through the liquid seal strainers 126 to vent to atmosphere without first being passed through the skim pile 10. The vent stack 128 also serves as a siphon break for the deck drainage system.

In this way, the gaseous portion of the collected fluids which passes through the vent 132 need not be forced downwardly through the vent stack 128 to the skim pile. Furthermore, harmful gases which may be present within the deck drainage system are readily vented to atmosphere without being unnecessarily detained within the vent stack 128 and the skim pile 10. By providing a flame arrestor at the open end of the vent stack 128, an inadvertent ignition of the harmful and flammable gases, as by a random spark, is prevented from flashing back through the vent stack 128.

As discussed above, the skim pile 10 is preferably located below the deck drains (for example at the boat deck 113 of the offshore platform facility) so that the skim pile extends into the body of water located beneath or adjacent to the platform facility. The high efficiency skimmer vessel is preferably at a generally higher elevation than the skim pile and therefore is preferably located on the cellar deck 114 (see FIG. 6).

With continued reference to FIG. 6, the output of a three-phase separator (including a mixture of oil, water and sand) is supplied to a surge settler 210 by an inlet 212. The surge settler is normally pressurized with a sand slurry passed intermittently vertically downwardly to a solids cleaner 216. In the surge settler, free oil and sand greater than 50 microns within the output of the three-phase separator are removed.

While the preferred configuration of the surge settler is disclosed with reference to FIGS. 20-27 and includes an intermittent crossflow through a corrugated plate assembly having plates with a sawtooth cross section oriented at 60° to the horizontal, other configurations for the surge settler are contemplated. For example, the surge settler could include simply an empty vessel of sufficient volume to dissipate surges in the supply of produced water and to permit free oil to rise and solid particles to fall to upper and lower portions of the vessel respectively for subsequent removal. Other suitable configurations for the surge settler include conventional corrugated plate arrangements of the CPI, —type and disclosed in U.S. Pat. No. 3,884,815 of Cornelissen, hereby incorporated by reference. These conventional corrugated plate assemblies are objectionable, however, because of the smooth curvature of the plate as a somewhat sinusoidal curve and also because of the orientation of the plates at 45° with respect to the horizontal.

In general, the surge settler disclosed in FIGS. 20-27 is preferred in oil field installations where high rates of produced water solids and a relatively small difference between the specific gravity of the free oil and water exists and emulsions are expected.

With regard to the preferred cross flow through the corrugated plate assembly of the surge settler of FIG. 20, it should be noted that the cross flow is somewhat less efficient for each of the different goals of oil removal and sand removal (when compared with a singular parallel flow through the corrugated plate assembly optimized for either sand removal or oil removal). The reduced efficiency of the preferred arrangement of the surge settler is acceptable however, because both tasks of oil removal and sand removal are accomplished within the single vessel.

In the solids cleaner, oil is removed from the sand (supplied by the surge settler 210). Oily sand from the three-phase separator can be intermittently supplied to the solids cleaner 216 through the inlet 218 with the separated oil (from the solids cleaner 216) periodically removed by an outlet 220 to a heater treater (not shown). The solids cleaner (which preferably operates under a pressure of about 30 psi) may also be provided with a gas vent 222 and an inlet 224 to admit oily sand from the heater treater to the solids cleaner.

The produced water including sand and oil droplets (of a diameter of about 50 microns or less) is supplied horizontally to a suitable conventional water washer 226 (such as is available from U.S. Filter). The water washer is a dissolved gas flotation cell which removes about 90–95% of the oil of a droplet size of about 50 microns or less in the produced water. The water washer includes a vent to atmosphere 228 with the recovered oil supplied vertically downwardly to the high efficiency skimmer vessel 20 by a conduit 230. Clean water for sand removal is supplied to the solids cleaner by a conduit 232.

Output from closed drains can be supplied, if desired through an inlet 234 to the high efficiency skimmer 20 and also recovered oil and water from the sand cleaning can be passed from the solids cleaner 216 by a conduit 236 to the high efficiency cleaner.

Finally, the clean sand from the solids cleaner 216 is intermittently passed vertically downwardly to the skim pile 10 by way of a conduit 238 for upsets, bypass and disposal conditions.

In this way, and as discussed in more detail below, a complete system for collecting, treating and disposing of oil-containing fluids at an offshore facility may be provided.

With reference now to FIG. 7, a deck drain 110 preferably includes a central cylindrical passageway 140 surrounded by a dish 142 which encircles the outer periphery of the cylindrical passageway 140. The cylindrical passageway 140 preferably includes a portion 144 which extends vertically upwardly from a lower portion of the dish 142 so as to provide an annular trough 146 about the interior of the dish 142. With reference to FIG. 8, a plurality of tabs 148 are arranged about an interior periphery of the dish 142 so as to receive a plate 150 (see FIG. 9). The plate 150 is provided with a plurality of slots 152 or serrations so as to prevent particles having a size larger than the dimensions of the slots from passing into the interior of the deck drain 110.

If desired, the dish 142 may have a rectangular cross section 144 (see FIG. 10). In that case the plate 150′ likewise has a rectangular cross section with the slots 152′ preferably arranged crosswise with respect to a major axis of the cross sectional area. Whether the dish 142 is circular or rectangular in cross section, or of some other configuration, the extension 144 of the cylindrical passageway 140 is preferably covered by a cap 154 (see FIG. 11). The cap 154 is provided with a plurality of ribs 156 which extend radially inwardly from an outer periphery of the cap. Each of the ribs 156 is provided with a depending tab 158 which is received within an interior of the projection 144. The ribs 156 maintain the cap a preferred distance above a bottom surface of the dish 142 and likewise the tabs 158 maintain a preferred spacing between an interior wall of the cap 154 and an exterior wall of the projection 144. In this way, a continuous passageway extending through the cover plate 150 and between the interior portion of the cap and the exterior portion of the projection 144 into the interior of the cylindrical passageway 140 is provided. Since the projection 144 extends vertically upwardly with respect to the lower portion of the dish 142, liquid is typically maintained within the drain at a level corresponding to the uppermost height of the projection 144. The drain has a self-sealing arrangement or configuration which prevents or greatly reduces the passage of gas from the cylindrical passageway 140 back to the atmosphere through the cover plate 150.

With reference now to FIG. 15, the liquid seal strainer 124 preferably includes a tubular cavity 160 formed of a cylindrical housing having a flange 162 at an uppermost end and a rounded end cap portion 164 at a lowermost end of the liquid seal strainer. A top plate 166 is releasably secured to the flange 162 as by bolts 168 so as to permit the removal of the plate 166 periodically for cleaning and inspection of the liquid seal strainer. The inlet 122 and the outlet 126 may likewise be provided with respective flanges 170, 172 to facilitate connection of the inlet and outlet with the immediately adjacent conduits. To facilitate mounting of the liquid seal strainer on the offshore platform facility, a mounting bracket 174 may preferably be connected to the cylindrical housing 160 as required. To limit the passage of solid material through the liquid seal strainer, a strainer plate 176 is preferably arranged diagonally within the interior of the liquid seal strainer so as to require all of the fluid passing from the inlet 122 to the outlet 126 to pass through the strainer plate 176. Preferably, the strainer plate is provide with a plurality of bores or passageways 178 of a cross sectional diameter corresponding to the preferred maximum size of the solid material passing through the strainer.

With reference to FIG. 19, a suitable conventional flame arrestor 132 such as Model 7618 of Groth Equipment Corporation, Houston, Tex. includes a generally cylindrical housing 190 provided with an expanded middle portion 192 which includes an internal wafer configuration 194. The flame arrestor is itself of conventional design and is used variously in both offshore and inland oil production facilities to prevent or inhibit flame propagation in gas piping systems. The flame arrestor 132 is preferably provided with at least one flange 196 so as to facilitate attachment of the flame arrestor to an end of the vent stack 128 (see FIG. 6).

With reference now to FIG. 18, the computation of a preferred diameter for the skim pile 10 may be computed as follows:

Assume for example that the drained deck area of the offshore facility includes 10,000 (ten thousand) square feet and that the water produced, for example, by a three phase separator from the oil and/or gas production is 5000 barrels per day. Locating 10,000 square feet on the x-axis and reading the corresponding value on the y-axis, one obtains a figure of 100 barrels assuming a maximum rain water of 2 inches per hour in twenty minutes (see diagonal A of FIG. 18). Similarly, locating a produced water value of 5000 barrels per day on the x-axis results in a corresponding value of 68 barrels for the produced water (see diagonal B of FIG. 18) assuming a twenty minute intermediate flow for the skim pile. Diagonals for other expected maximum amounts of rainwater, etc. could be easily provided on the computational aid by those skilled in the art upon reading the present specification.

Therefore, the total water to be handled by the skim pile is equal to 100 barrels plus 68 barrels for each twenty minute intermediate flow based on the maximum load on the skim pile resulting from produced water and from the maximum assumed level of rain water of two inches per hour in twenty minutes. Entering the value of 168 barrels on the x-axis results in a corresponding length of a 48 inch diameter skim pile (see diagonal C of FIG. 18) of 104 feet and a corresponding length of a 42 inch diameter skim pile (see diagonal D of FIG. 18) of 135 feet. If a 36 inch diameter skim pile (see diagonal E of FIG. 18) is to be utilized, the required length equals 110 feet plus 75 feet equal to 185 feet of length which is obtained by entering the value of 100 feet on the x axis and reading the corresponding value and likewise entering the value of 68 barrels on the x axis and reading the corresponding value for the 36 inch diameter skim pile. Using this graph, the minimum length of skim pile which is suitable for accommodating the expected maximum volume of produced water and the expected maximum volume of rain water for two inch per hour operation in twenty minutes can be obtained.

In operation, the rainwater and oil containing fluids which occur at the top deck and cellar deck for example of an offshore platform facility are collected by the drains provided for each deck of the facility with the fluid supplied through a common passageway to an inlet of a seal. The seal prevents a backflow of gas through the various drains of each system with the plurality of seals supplying the fluid to a common vent stack for supply for example to a skim pile where the oil may be separated or recovered from the rain water. Downstream of the seal, harmful and flammable gases are vented through a vent stack communicating with the atmosphere. Preferably, a flame arrestor is configured so as to prevent a flashback of an inadvertent flame into the vent stack.

With reference now to FIG. 20, a preferred embodiment of the surge settler 210 of FIG. 6 includes an elongate metal chamber 310. The chamber 310 includes a generally cylindrical mid portion 312 closed on either end by left and right head sections 314, 316. The cylindrical mid portion 312 as shown, includes a single arrangement of corrugated plates 318 (see also FIG. 24) although additional arrangements of corrugated plates may be provided (so as to enlarge the flow capacity of the surge settler) within an enlarged mid-portion 312 if desired.

So as to provide access to the interior of the surge settler, a manhole opening 320 is preferably provided in both the left head 314 and the right head 316. Furthermore, a manway 320 is preferably also provided in the midportion 312 at the uppermost side of the surge settler to provide access to the arrangement of corrugated plates 318. If desired, a covered manhole 322 may also be provided in at least one of the head portions 314, 316 to provide additional access to the interior of the surge settler.

A passageway 324 provides communication through the left head portion with the interior of the surge settler at an uppermost portion of the surge settler. Preferably, the passageway 324 is provided with a rupture disk assembly (not shown) so as to provide a mechanism whereby excessive pressures within the surge settler may be safely vented in an emergency situation without rupture of the surge settler itself. A relief valve assembly (not shown) preferably also communicates with the passageway 324 so as to safely vent excessive pressures which may build up within the surge settler.

The passageway 324 provides a vent for gases removed from the fluid passing through an entrance chamber 326 of the surge settler with the passageway 324 including various controls (not shown) for regulating the flow of gas through the passageway 324.

The entrance chamber 325 is defined by the left head portion 314 and a left bulkhead 328. The right head portion 316 and a right bulkhead 330 define an exit chamber 332 with an intermediate chamber 334 defined between the bulkheads 328, 330.

With reference again to FIG. 6, produced water from a three phase separator is supplied, generally at a constant rate but including some surges of flow, by way of a passageway 212 to the surge settler by way of a conduit 326. The produced water after passing through the surge settler is intermittently permitted to leave the vessel by way of an outlet conduit 328 provided in the right head portion 316. The produced water then flows to the water washer 226 (see FIG. 6) for further treatment.

So as to provide an intermittent flow within the surge settler, a plurality of level control sensors 330 are provided in communication with the entrance chamber 326 of the surge settler. When the level of produced water within the surge settler has reached the preferred upper level, a suitable switch arrangement opens the outlet 328. The produced water is then passed out of the surge settler until the level of produced water reaches the preferred lower level at the lower sensor 330 (at which time the water outlet 328 is closed. Gas is admitted or withdrawn through the passageway 324 so as to maintain a constant pressure within the surge settler of about 50 psi. The pressurized gas helps to urge the produced water out of the surge settler when the outlet 328 is open.

For periodic cleaning, a plurality of drains 340 are provided in both the left and right head portions 314, 316 at a lowermost portion of the surge settler. The drains 340 primarily remove solids particles which collect at the lowermost portion of the entrance and exit chambers 325, 332.

As desired, various sight glasses 342 may be provided in both the left and right head portions and elsewhere as desired so as to permit visual observation of the passage of the produced water through the surge settler.

So as to facilitate the mounting of the surge settler 310 at the offshore facility, the mid-portion 312 may be mounted on I-beams 344 arranged transversely with respect to the surge settler (see also FIG. 25). The left and right head portions 314, 316 may be fastened to the central portion 312 permanently as by welding if desired, or may be bolted by way of flanges 346, 348 which facilitate removal of the head section. Preferably, at least the right head section is bolted to the mid section 312 so as to permit access to the corrugated plate arrangement 318 as desired.

A plurality of upwardly extending channel members 350 are arranged sequentially throughout the bottom portion of the mid section 312 with water jet inlets 352 provided in the passageways defined between the adjacent corrugations. In this way, jets of water are supplied periodically to assist in the removal of solids collected in the lower portion of the surge settler as desired.

With reference also to FIG. 21, a conduit 354 is provided in the entrance chamber 326 with an inlet of the conduit 354 provided at a lowermost portion of the entrance chamber 326. The conduit 354 communicates with a manifold 356 (see FIG. 23) including two longitudinally oriented conduits 358, 360. Each of the conduits 358, 360 extends throughout the intermediate chamber 354 and is provided with two series of slots 362. Each of the slots is elongated and is provided between an associated pair of plates 364 with the associated slot 362 supplying produced water from the conduit 354 to the space defined between the associated plates 364. Each slot 362 preferably extends 60° upwardly or downwardly from the horizontal in the respective conduit 358, 360. In this way, the produced water from the entrance chamber 326 is generally evenly supplied by way of the conduits 358, 360 to the plurality of corrugated plates 318 by way of the plurality of planar plates 364.

The conduits 358, 360 are plugged at the end of the intermediate chamber 334 so as to require all of the produced water to pass through the corrugated plates 318. With reference to FIG. 24, the passageway defined by a pair of associated planar plates 364 and supplied with produced water by a pair of slots 362 is also bounded by the vessel wall 312 and upper and lower guide walls 366, 368. In this way, the produced water is generally evenly supplied throughout the entire extent of the corrugated plate arrangement 318.

With reference again to FIG. 23, a plate 370 is provided adjacent to the outlet of the conduit 326 so as to deflect the flow of the produced water entering the entrance chamber 326. As a result of the deflection, some gas is liberated from the produced water which gas passes upwardly through the conduit 324 to a suitable vent.

With reference again to FIG. 24, a plurality of planar plates 364 is similarly provided on an exit side of the plurality of corrugated plates 318. Likewise, a pair of conduits 372, 374 pass longitudinally through the intermediate chamber 334 and are provided with two series of slots 376 to receive the produced water from the corrugated plate assembly 318 between a pair of adjacent parallel plates 364. The slots 362 of the conduits 372, 374 extend upwardly or downwardly for an extent of 60° with respect to the horizontal. The conduits 372, 374 are plugged at the entrance chamber so as to prevent the conduits from passing the produced water from the entrance chamber directly to the exit chamber.

The produced water collected by the conduits 372, 374 is passed through to a manifold 376 which communicates with a conduit 378. The outlet of the conduit 378 is provided at a lowermost portion of the exit chamber 332 to permit additional gas still present within the produced water to pass upwardly and out of the exit chamber 332 through an appropriate vent. The produced water is removed from the exit chamber 332 by way of the exit conduit 328.

If the right head portion 316 is joined to the intermediate portion 312 by way of associated flanges, it is preferable to provide additional reinforcement in the bulk head 330 separating the intermediate chamber from the exit chamber. The additional reinforcing may preferably include crossed struts 380, 382 and a rectangular wall plate 384 which is bolted to the bulk head 330. Preferably, the bulk head 330 includes a rectangular opening corresponding to the rectangular plate 384 so as to facilitate the removal of the corrugated plate arrangement 318 through the opening in the bulk head.

With reference again to FIG. 23 and FIG. 25, the intermediate portion 312 is preferably cradled within an I-beam arrangement 344. Since the intermediate chamber is preferably cylindrical in shape, the I-beam assembly 344 preferably conforms to the circular cross-section of the intermediate portion 312.

With reference again to FIG. 20, a conduit 386 preferably communicates with an uppermost portion of the intermediate chamber 334 so as to appropriately vent gasses collected in the uppermost portion of the chamber 312. With reference to FIG. 24, a plurality of baffles 388 extend longitudinally through the intermediate chamber 334 and direct free oil and the gas to the uppermost portion of the intermediate chamber. An appropriate conduit 390 is provided so as to withdraw the collected free oil from the intermediate chamber.

As the produced water passes cross-wise through the corrugated plate arrangment 318, free oil within the produced water will tend to rise while the solid portion including sand and other particles will have a tendency to fall. Therefore, the sand and other solid particles will collect in the lowermost portion of the intermediate chamber 334 and must be either continuously or periodically removed. The channel members 350 extend crosswise through the intermediate chamber 334 and define a series of four adjacent channels 392. An associated conduit 352 periodically supplies a jet of water as desired to the associated channel 392 with the sand and other solid particles and associated fluids withdrawn through an appropriate conduit member 394 provided at an opposite end of each channel 392. Preferably, each of the exit conduits 394 has a considerably larger cross-sectional area than the water jet inlets 352 since the outlets must accommodate a relatively greater volume of fluid and particulate matter.

With reference now to FIG. 26, the corrugated plate arrangement 318 includes a plurality of individual corrugated plate members 396 each of which is arranged parallel with the other individual corrugated plates in the arrangement 318. Preferably, each plate 396 is generally planar but includes a series of pronounced folds 398 (having a sawtoothed cross section) defining a sequence of valleys and peaks for each plate 396. Preferably, each of the peaks and valleys also has an angle of about 60° defined between adjacent walls of the peaks and valleys. Since the adjacent plates 396 are arranged so that each of the peaks is aligned with the peaks of the adjacent plates, a uniform spacing is provided throughout the entire corrugated plate assembly.

As shown in FIG. 26, the ends of the plates 396 define a plurality of parallel passageways oriented preferably at an angle of about 60° with respect to the horizontal. It should be noted that the angle of repose of oil wet sand is about 50°. The plurality of parallel passageways defines an inlet side 400 for the corrugated plate arrangement with an outlet side 402 defined on the other side of the corrugated plate arrangement. Likewise, a top side 404 and a bottom side 406 for the corrugated plate arrangement may be defined with opposite end portions 408, 410 similarly defined about the corrugated plate arrangement. The top and bottom edges, 404, 406 and the portions 408, 410 all include a herring-bone like arrangement of passageways between adjacent plates whereas the inlet and outlet sides 400, 402 define generally parallel passageways which are oriented at an angle of about 60° with respect to the horizontal. A crosswise flow of the produced water results because the supply and withdrawal of the produced water extends crosswise to the peaks and valleys of the plates (and not parallel with the peaks and valleys of the plates).

Triangular fillers 414, 416 extend along opposite edges of the corrugated plate assembly in the region where the individual corrugated plates would have a significantly reduced length. Because of the significantly reduced length, the passageway defined between the adjacent corrugated plates would be insufficient to adequately treat the produced water passing between these relatively short plates.

With reference again to FIG. 24, the produced water supplied by the conduits 358, 360 enters the corrugated plate arrangement 318 between adjacent corrugated plates 396. As the produced water travels generally cross-wise through the corrugated plate assembly, the free oil within the produced water will have a tendency to collect in the peaks 398 of each corrugation and pass upwardly through the upper edge 404 of the corrugated plate assembly. Conversely, the solid particles will tend to collect in a valley of the lower (but adjacent) corrugated plate and travel downwardly within the valley to the bottom wall of the corrugated plate assembly 406 where the solid particle may be collected between the channels 350 and withdrawn through the conduits 394. The oil and solid particles tend to separate from the produced water because of friction forces exerted on the fluid passing between the corrugated plates. The sand has a slower velocity through the plates and tends to collect in a valley whereas the oil passes quickly (with respect to the produced water) and tends to rise to the peaks.

Preferably, the corrugations of each plate 396 are formed by planar sections joined to one another at specific fold lines so as to form a series of sharp peaks and valleys as a sawtooth instead of relatively gentle curves. Furthermore, it is particularly important that the plates be oriented at more than 50° and preferably at about 60° with respect to the horizontal so as to most efficiently separate oil and solid particles from the produced water.

With reference again to FIG. 26, a rectangular frame 418 is provided by right angle members 420 which are connected to one another so as to maintain the appropriate spacing between the adjacent corrugated plates 396. Preferably, each of the right angle members 420 which is provided about the perimeter of the inlet and outlet walls 400, 402 is provided with a plurality of appropriately sized slots 422 so as to receive an edge of the associated corrugated plate within the associated slot 422 of the right angle member 420. Furthermore, so as to maintain a rigid stability in the structure, a plurality of tie rods 424 can be provided as desired to connect the various members of the frame 418. Typical spacing for the planar plates 364 is about 1 inch with 72 plates provided over a longitudinal extent of about 6 feet. Similarly, about 85 corrugated plates 396 are preferably provided in a corrugated plate assembly 318 having a length of 7 feet in a surge settler arranged to treat about 15,000 barrels of produced water per day depending upon the difference in specific gravity between the free oil and the water, the temperature, viscosity and flow rates of the produced water.

It should be noted that appropriate passageways must be provided on either end of the corrugated plate assembly 318 so as to permit the fluid and solid particles leaving the corrugated plate assembly to either rise or fall as appropriate. If no passageways are provided, the spaces between the corrugated plates would eventually fill with oil and solid particles thereby clogging the corrugated plate assembly.

In operation, the produced water from a three-phase separator or from any other suitable source, is generally continuously supplied to the entrance chamber (under pressure of about 50 psi) by way of the conduit 326 where the produced water may periodically vent a portion of the gas within the produced water along with a portion of the solid particles which may settle out from the produced water in the entrance chamber. The produced water then flows through the entrance manifold 356 between the parallel plates 364 and flows in a cross-flow direction through the corrugated plate assembly 318. While within the corrugated plate assembly, much of the oil within the produced water will have a tendency to collect in the peaks of the corrugated plates and pass upwardly to an upper portion of the intermediate chamber. Conversely, much of the solid particles within the produced water will have a tendency to collect in the valleys or troughs of the corrugated plate assembly and pass downwardly to a lowermost portion of the intermediate chamber where the solid particles can be periodically flushed out of the intermediate chamber preferably by way of water jets. The solid particles, however, will likely include a relatively large percentage of oil requiring further treatment before being sufficiently clean. The produced water which is relatively oil free and relatively free of solid particles then passes transversely through the corrugated plate assembly and is collected by the exit manifold and supplied to the exit chamber 332 where additional gas has an opportunity to vent from the produced water and with the remaining produced water passed out of the surge settler for further treatment.

In the preferred configuration of the surge settler and the solids cleaner, an intermittent flow arrangement (and essentially all of the equipment of FIG. 6 other than the deck drainage system) is particularly effective at increasing the efficiency of the system. For example, the flow of the produced water into the surge settler is relatively constant (but with occasional surges which are dissipated in the entrance chamber). The flow out of the surge settler is periodically cycled, however, so as to significantly increase the amount of time that the produced water spends within the corrugated plate assembly. For example, the outlet 328 of FIG. 20 will typically be opened until the Revel of fluid within the vessel drops to the lower level sensor 330. At that time, the outlet 328 will be closed until the level of fluid within the vessel rises to the high level sensor 330 at which time the outlet 328 is again opened. The pressure within the vessel is constantly maintained at a desired level of perhaps 50 psi so as to urge the fluid through the (supplied, and vented as appropriate by way of the entrance chamber) corrugated plate assembly when the outlet 328 is open.

A similar intermittent operation is provided for the sand cleaner by way of the upper and lower level sensors 462, 464 (see FIG. 28).

With reference now to FIG. 28, a solids cleaner according to the present invention includes a generally upright cylindrical vessel 440 including an inlet conduit 442 provided at an uppermost portion of the solids cleaner 216. The inlet conduit 442, with reference also to FIG. 29 periodically supplies the slurry of solid particles from the surge settler into a cyclone separator assembly 446 having the general configuration of a funnel. A vortex within the slurry is interrupted by a plate 448 provided within an outlet 450 of the cyclone separator 446 so as to disrupt the swirl of the slurry periodically supplied to the cyclone separator.

Concentrically mounted within the vessel 440 is a series of equally spaced corrugated plates with each plate having a generally conical configuration. More properly, each of the corrugated plates generally forms the outer surface of a frustum of a right circular cone but with a corrugated rather than smooth surface. The inner radii of the plurality of corrugated plates defines a central passageway passing longitudinally through the corrugated plate assembly with the outlet of the cyclone separator oriented downwardly towards the inlet of the corrugated plate assembly. Each of the plates 452 is directed downwardly with the smaller radius of the frustum being lower than the larger radius of the frustum. An upwardly directed frustum 454 surrounds the outlet 450 of the cyclone separator and defines an oil collection chamber 456 for the solids cleaner. A conduit 458 communicates with the oil collection chamber 456 and passes centrally downwardly through the solids cleaner and communicates with an outlet 220 for the free oil. An uppermost portion of the conduit 458 includes a branched connection so as not to interfere with the downward flow of material through the outlet 450. If desired, the uppermost portion of the conduit 458 may include a circular channel 460 which encircles the outlet 450. The channel 460 would than communicate with the branches of the conduit 458.

A pair of passageways 462, 464 communicates with the oil collection chamber 456 so as to ensure that an appropriate level of liquid is maintained within the solids cleaner. Preferably, the low level passageway 464 is provided at the outermost portion of the frustum 454 with the upper passageway 462 provided slightly above the channel 460. The solids cleaner, like the surge settler preferably operates under pressurization with a preferred pressurization being about 20-30 pounds per square inch. Water may be added from the water washer as needed so as to maintain the desired pressure in the solids cleaner.

An annular passageway 466 is defined about the outer perimeter of the corrugated plate assembly so as to permit the free oil to rise upwardly to the relatively oil free produced water to pass downwardly to an outlet passageway 468. The outlet passageway 468 communicates with an annular channel 470 in communication with the annular passageway 466. Preferably, the vessel 440 includes an upper portion 472 which is joined to a lower portion 474 by way of associated flanges 476 in the vicinity of the passageway 470. Also provided about the periphery of the conical corrugated plate assembly is a perforate cylindrical casing 475 (see also FIG. 35). The casing 475 preferably includes one orifice at each peak of each of the corrugated plates. By arranging the respective orifice at the peak of the corrugated plates, the oil (and water) is permitted to pass out into the annular passageway 466 while the solid particles are maintained within the corrugated plate assembly. Eventually, the solid particles will separate from the slurry and flow downwardly along a valley to the lowermost portion of the solids cleaner. Meanwhile, the oil associated with the solid particles has adequate time to rise into the peak and flow out through the orifice to the oil collection chamber.

If desired, at least one manway 478 may be provided at the lowermost portion of the corrugated plate assembly so as to facilitate access to a lowermost portion of the solids cleaner. The lower portion 474 of the solids cleaner preferably has a tapering configuration so as to urge solid particles collected within the lowermost portion of the solids settler toward one another. A plurality of sensors 476 are arranged throughout the lowermost portion of the solids cleaner so as to sense the level of solid material within the solids collection chamber. Periodically as desired, one or more water sand cleaning eductors 478 may be activated so as to provide an agitation of the solid particles within the solids cleaner. The sand cleaning eductors 478 are preferably supplied with relatively clean water from the water washer.

Preferably, the sand slurry from the surge settler is supplied only periodically by way of the valved conduit 442. Typically, the slurry is supplied about once every hour, with the slurry agitated and allowed to settle every 20 minutes. For example, the slurry within the solids cleaner will be agitated by the sand cleaning eductors 478 for about five minutes and allowed to settle for fifteen minutes. This cycle will be repeated perhaps three times and then the sand slurry will be dumped through the valved outlet 480 at which time a new flow of slurry into the solids cleaner is permitted.

Typically, the solids cleaner operates under pressure (at a relatively constant pressure of about 30 psi. The sand cleaning eductors 478 will typically supply water at about 50 psi. When the level of fluid exceeds the high preferred level sensor 462, some of the fluid is removed. Similarly, when the level of fluid falls below the low level sensor 464, additional fluid is added. The sand cleaning eductors each have a jet orifice provided within a venturi throat so as to act as a pump. The sand cleaning eductors each pump about 3 gallons of slurry for each gallon of water.

With reference now to FIG. 30, the annular passageway 470 includes a flange 482 which receives the corrugated plate assembly, with a seal provided between the assembly and the flange.

Referring now to FIG. 32, each of the corrugated plates 452 is preferably formed of four identical sections 482 which when appropriately folded so as to form the desired corrugations, extends over 90° or one fourth of a circumference. Therefore, four identical sections 482, when joined together with one another extend over a complete 360° revolution (see FIG. 34). Each of the sections 482 has a fan-like configuration defined by a plurality of identical vanes 484. Each vane includes a pair of major, converging fold lines 486, 488 and inner and outer edges 490, 492. The outer edge 492 is preferably curved so as to correspond to the internal curvature of the vessel 440 when the member 482 is assembled within the solids cleaner. Each of the panels 484 is adjacent an identical panel 484 but with the orientation of adjacent panels alternatively reversed.

In a preferred embodiment, each panel 482 is formed of eight identical portions 484 with the first panel 484 including a narrow flange strip 494. Likewise, the eighth panel also includes a widened flange strip 496. The widended flange 496, however, includes an offset (see FIGS. 34 and 35) so as to facilitate the joining of an adjacent corrugated plate 454 to the upper and lower adjacent plates.

With particular reference to FIG. 34, the narrow flange 496 extends beyond the widened flange 494 for engagement with the immediately adjacent corrugated plate. Similarly, the narrow flange 496 from the immediately preceeding corrugated plate preferably extends between the pair of flanges 494, 496 from another set of plates and is bolted together therewith. In this way, each of the corrugated plates 454 is rigidly connected to the pairs of adjacent plates so as to provide a uniform spacing between the adjacent plates.

With particular reference to FIG. 34, each of the interior angles between adjacent panels 484 is preferably about 98.2° with each of the exterior angles between adjacent panels 484 being about 118.2°. When viewed radially, (see FIG. 35) the angle between the adjacent panels is about 60° at the outer perimeter of the plates. Preferably, a spacing of about ¾ of an inch is provided between adjacent plates with about 20 plates of a diameter of about four feet being sufficient to treat about 3-5 barrels of sand per day using about 3500 barrels of water in the sand cleaning eductors per day, depending upon the difference in specific gravity between the oil and water, the temperature, viscosity and flow rate of the material.

In operation, the slurry of material including solids to be cleaned, is periodically supplied to the cyclone separator by way of the valved inlet 442. The slurry passes downwardly through the outlet 450 with a vortex flow within the slurry being disrupted by the vortex interrupter 448. The slurry passes downwardly through the inlet defined by the corrugated plate assembly and then flows in a reverse manner upwardly between adjacent conical, corrugated plates. While between the adjacent conical, corrugated plates, the oil within the slurry has a tendency to adhere to the peaks within the corrugations of the plates whereas the solid particles have a tendency to collect in the valleys of the various plates. Therefore, the oil, water and solid particles have a tendency to separate from one another as a result of the different rates of flow induced in the different materials by the conical corrugated plate configuration. Since the plates are oriented generally downwardly, the solid particles flow in a reverse manner toward the lowermost portion of the solids cleaner where the solid particles eventually pass outwardly through an exit port 480. The water which is relatively free of oil and relatively free of solid particles flows upwardly between the adjacent corrugated plates and then is removed by way of the water outlet 468. The free oil which is lighter than the water rises to the oil collection chamber 456, where the free oil is removed from the solids cleaner by way of the conduit 458 and exit conduit 220. Any gas which has been liberated from the slurry within the solids cleaner is vented in an appropriate manner through the outlet 222.

The slurry is periodically agitated by the sand cleaning eductors, as described above with a sufficiently long period of time for settling of the sand allowed between sequential agitations.

Depending upon the depth of the surrounding body of water, (and therefore the maximum depth of the skim pile or skim piles) the rate of produced water and the expected deck drainage, it may be advantageous to utilize two or even three skim piles (see FIG. 36). In these situations, one skim pile may be available solely for deck drainage and for unexpected events. For example, an inadvertent failure of a valve may cause relatively pure oil to pass through the pollution control system of FIG. 6. By having sufficient capacity to accomodate both the expected normal flow rates along with the predicted abnormal (worst case) situation, highly damaging oil spills into the surrounding body of water can be either eliminated or greatly reduced.

With reference to FIG. 6 and FIG. 36, a complete system for treating produced water and collected rain water especially at an offshore oil/gas processing facility preferably includes a three phase separator (not shown) which supplies produced water to a surge settler 210. The produced water supplied to the surge settler 210 by way of the conduit 212 may not be passed directly into the surrounding body of the water without appropriate treatment since the produced water includes an excessive amount of oils and other contaminates which would pollute the surrounding body of water. While within the surge settler, the produced water is permitted to vent a portion of the gas present within the produced water and furthermore, the produced water is divided into a first portion which is relatively free of solid particles and a second portion which is relatively rich in solid particles. The first portion is intermittently passed to the water washer 226 where a substantial portion of the oil droplets (which are less than 50 microns in diameters) is removed from the produced water. A conventional water washer such as produced by U.S. Filter is described in U.S. Pat. No. 3,972,815 which is hereby incorporated by reference. While within the water washer, the first portion is divided into a third portion which is relatively oil-free and also into a fourth portion which is relatively oil rich. The third portion of the produced water is then supplied to a skim pile for further treatment and the fourth portion is supplied to a high efficiency skimmer for further oil removal. The second rich portion of the produced water from the surge settler is periodically supplied to the inlet of the solids cleaner where the second portion is further treated. While within the solids cleaner, the second portion is divided into a fifth portion which is relatively solids rich and oil free and which is then periodically supplied directly to the conventional skim pile, and a sixth portion which is relatively oil rich and is supplied periodically to the high efficiency skimmer 20. While being treated within the solids cleaner, oil will be further removed from the slurry which oil is removed from the solids cleaner in an appropriate manner.

While within the high efficiency skimmer, still further oil is removed from the sixth and fourth portions which oil is removed from the high efficiency skimmer in an appropriate manner. A seventh relatively oil free portion is then intermittently supplied by the high efficiency skimmer to the skim pile 10 for further treatment and passage (disposal) into the surrounding body of water. An eighth portion which is relatively oil rich is separated by the skim pile and intermittently returned to the high efficiency skimmer for further treatment and further oil removal. As discussed previously, the collected rain water which includes various oils and other contaminates from the deck drains is preferably supplied by way of the liquid seal strainers to a vent stack 128 and then supplied directly to the skim pile 10 for oil removal. Gas is permitted to vent from the vent stack 128 through the flame arrester 132 between the liquid seal strainer 124 and the skim pile 10.

If the produced water from the three phase separator is relatively devoid of solid particles, the solids cleaner can be eliminated and the second portion then passed directly to the skim pile for further oil removal. Likewise, the water washer may be eliminated if the volume of produced water per day is relatively small as is typically the case in gas fields. In this case, the first portion from the surge settler would be passed directly to the skim pile for further oil removal.

Of course, situations may arise where more than one solids cleaner, water washer, or skim pile, etc. will be necessary in order to accomodate the expected rate of fluid to be treated (see FIG. 36). The particular configuration and relative size of each component will be readily obvious to one skilled in the treatment of produced water and collected deck drainage in view of the present specification and drawings.

Although the present invention has been described in connection with preferred forms thereof it will be appreciated that additions, modifications, substitutions and deletions may be made without departing from the spirit and scope of the invention.

What is claimed is:

1. A surge settler for removing solid particles of about 50 microns or more and free oil droplets of about 50 microns or more from a fluid, comprising:

a surge settler vessel having a first partition defining an entrance chamber and a second partition defining an exit chamber and said first and second partitions together defining an intermediate chamber;

inlet means for supplying said fluid to the entrance chamber;

first passageway means for conducting said fluid from the entrance chamber to said intermediate chamber;

means for treating said fluid within the intermediate chamber including a plurality of corrugated plates each arranged generally parallel to one another and generally equally spaced from adjacent corrugated plates oriented at an angle of about 60° with respect to the horizontal, each of said corrugated plates being generally planar having first and second generally linear side edges and first and second saw toothed end edges, the first side edges of said plurality of corrugated plates defining a first side of said means for treating said fluid with the second side edges of said plurality of corrugated edges defining a second side of said means for treating said fluid, said plurality of corrugated plates being generally rectangular;

means for withdrawing oil above said means for treating, said oil being released from said fluid while passing through said means for treating;

means for withdrawing gas above said means for treating, said gas being released from said fluid while passing through said means for treating;

means for withdrawing solid particles beneath said means for treating, said solid particles being released from said fluid while passing through said means for treating;

second passageway means for conducting said fluid from the second side of said means for treating to the exit chamber;

said first passageway means including first guide means for supplying said fluid generally evenly about said first side, said second passageway means including second guide means for withdrawing said fluid generally evenly about said second side, said first and second guide means each being comprised of a plurality of parallel guide plates generally equally spaced with respect to one another;

outlet means for withdrawing said fluid from the exit chamber.

2. The surge settler of claim 1 wherein the means for withdrawing solid particles includes a plurality of sand cleaning ejectors which assist in the removal of the solid particles from the intermediate chamber.

3. The surge settler of claim 2 wherein said means for withdrawing solid particles includes a plurality of generally parallel channels, said plurality of jets being provided along one side of said plurality of parallel channels with a plurality of outlets being provided along another side of the plurality of parallel channels opposite said plurality of jets.

4. The surge settler of claim 1 wherein said inlet means supplies said fluid to an upper portion of said entrance chamber and said first passageway withdraws said fluid from a lower portion of said entrance chamber, and wherein said second passageway means supplies said fluid to a lower portion of said exit chamber and said outlet means withdraws said fluid from an upper portion of said exit chamber.

5. An apparatus for removing and cleaning solid particles from a fluid, comprising:

a surge settler vessel having inlet means for admitting said fluid and outlet means for withdrawing said fluid;

a plurality of corrugated plates arranged within said surge settler vessel, each of said corrugated plates being generally parallel to one another and generally equally spaced with respect to one another, each of said plates being oriented at about 60° with respect to the horizontal with said fluid arranged to flow crosswise through said plurality of corrugated plates;

first means for removing oil and gas from above said plurality of corrugated plates;

a solids cleaner vessel vertically beneath said surge settler vessel;

conduit means for supplying said solid particles from said surge settler vessel generally downwardly to said solids cleaner vessel;

means for cleaning said solid particles within said solids cleaner vessel including a plurality of corrugated plates generally equally spaced from one another, each of said corrugated plates extending upwardly at an angle of about 60° with respect to the horizontal, said corrugated plates defining passageway means for said solid particles wherein said solid particles first flow upwardly between said corrugated plates and then flow downwardly along channels of said corrugated plates after said solid particles separate from said fluid;

second means for removing free oil and gas from above said plurality of corrugated plates; and second means spaced from said corrugated plates for removing solid particles from beneath said plurality of corrugated plates.

6. An arrangement for separating and cleaning solid particles from a fluid, comprising:

a surge settler vessel having inlet means for admitting said fluid and outlet means for withdrawing said fluid;

a plurality of corrugated plates arranged within said surge settler vessel, each of said corrugated plates being generally parallel to one another and generally equally spaced with respect to one another, each of said plates being oriented at about 60° with respect to the horizontal with said fluid arranged to flow crosswise through said plurality of corrugated plates;

first means for removing free oil and gas from above said plurality of corrugated plates;

a solids cleaner vessel vertically beneath said surge settler vessel;

conduit means for supplying said solid particles from said surge settler vessel generally downwardly to said solids cleaner vessel;

means for cleaning said solid particles within said solids cleaner vessel including a plurality of generally conical corrugated plates arranged generally about a common vertical axis and generally equally spaced from one another, said plurality of generally conical corrugated plates defining a central inlet passageway for said fluid about said common vertical axis, each of said generally conical corrugated plates extending upwardly at an angle of about 60° with respect to the horizontal, said conical corrugated plates defining passageway means for said solid particles wherein said solid particles first flow upwardly between said conical corrugated plates and then flow downwardly along channels of said conical corrugated plates after said solid particles separate from said fluid;

second means for removing free oil and gas from above said plurality of generally conical corrugated plates; and second means spaced from said conical corrugated plates for removing solid particles from beneath said plurality of generally conical corrugated plates.

7. The arrangement of claim 6 further comprising: means for interrupting a vortex flow of said solid particles supplied to said solids cleaner vessel.

8. The arrangement of claim 6 further comprising: sand cleaning eductor means for assisting in the cleaning and removal of solid particles from beneath said plurality of generally conical corrugated plates.

9. The arrangement of claim 6 further comprising: means for collecting and removing fluid from about a perimeter of said plurality of generally conical corrugated plates.

10. The arrangement of claim 6 further comprising: skim pile means for further cleaning and disposing of said solid particles removed from said solids cleaner vessel, said skim pile means being arranged vertically beneath said solids cleaner vessel.

11. Apparatus for cleaning a fluid, especially produced water and collected deckdrainage on an offshore facility for oil or gas production, comprising:

surge settler means for separating the fluid into a first portion which is relatively free of solid particles and a second portion which is relatively rich in solid particles;

water washer means for removing oil from the first portion, said water washer means being operable to separate the second portion into a third portion which is relatively free of both oil and solid particles, and a fourth portion which is relatively rich in oil;

solids cleaner means for removing oil from the second portion, said solids cleaner means being operable to separate said second portion into a fifth portion which is relatively rich in solid particles and free of oil and a sixth portion which is relatively free of solid particles;

high efficiency skimmer means for further removing oil from the fourth and sixth portions, said high efficiency skimmer means being operable to supply said cleaned fourth and sixth portions as a seventh portion which is relatively free of both solid particles and oil;

skim pile means for still further removing oil from the third, fifth and seventh portions, said skim pile means being operable to supply an eighth portion which is rich in oil to said high efficiency skimmer for further oil removal thereby; and conduit means for supplying fluid directly to the skim pile means for oil removal.

12. The apparatus of claim 11 wherein said solids cleaner means is vertically lower than said surge settler means.

13. The apparatus of claim 12 wherein said skim pile means is vertically lower than said solids cleaner means.

14. The apparatus of claim 11 further comprising: means for withdrawing free oil from said surge settler means, said water washer means, said solids cleaner means and said high efficiency skimmer means; and means for venting gas from each of said surge settler means, said water washer means, said solids cleaner means and said high efficiency skimmer means.

15. The apparatus of claim 11 wherein said surge settler means includes a plurality of corrugated plates each arranged generally parallel to one another and generally equally spaced from one another with said fluid flowing crosswise through said plurality of corrugated plates and wherein said solids cleaner means includes a plurality of generally conical corrugated plates arranged generally parallel to one another about a common vertical axis, the fluid flowing generally upwardly between adjacent generally conical corrugated plates.

16. Apparatus for cleaning a fluid, especially produced water in an offshore facility for oil or gas production, comprising:

surge settler means for separating the fluid into a first portion which is relatively free of solid particles and a second portion which is relatively rich in solid particles;

water washer means for removing oil from the first portion, said second means separating the second portion into a third portion which is relatively free of both oil and solid particles and a fourth portion which is relatively rich in oil;

high efficiency skimmer means for removing further oil from the fourth portion, said high efficiency skimmer means providing a fifth portion;

skim pile means for removing still further oil from the third portion and the fifth portion, the skim pile means providing a sixth portion which is relatively rich in oil to the high efficiency skimmer means for removing still further oil.

17. Apparatus for cleaning a fluid, especially produced water in an offshore facility for oil or gas production, comprising:

surge settler means for separating the fluid into a first portion which is relatively free of solid particles and a second portion which is relatively rich in solid particles;

solids cleaner means for removing oil from the second portion, said solids cleaner means separating said second portion into a third portion which is relatively rich in oil and a fourth portion which is relatively rich in solid particles and relatively free of oil;

high efficiency skimmer means for removing oil from the third portion and from the first portion, said high efficiency skimmer providing a fifth portion which is relatively free of oil;

skim pile means for removing oil from the fourth portion and the fifth portion, said skim pile means supplying a sixth portion which is relatively rich in oil to the high efficiency skimmer means for further oil removal.

18. A method for treating a fluid, especially produced water from a three phase separator in an offshore oil or gas production facility, comprising the steps of:

flowing said fluid crosswise through a passageway having a corrugated configuration, said crosswise flow of said fluid urging oil and gas to separate from the fluid and flow upwardly along peaks of the passageway, said crosswise flow of said fluid also urging solid particles to separate from the fluid and flow downwardly along valleys of the passageway, said peaks and valleys being oriented at about 60° with respect to the horizontal;

periodically removing free oil from above the passageway;

periodically removing solid particles from beneath the passageway; and periodically removing relatively clean water from the passageway.

19. The method of claim 18 further comprising the steps of initially passing said fluid into an entrance chamber, prior to said flowing crosswise through the passageway, said fluid releasing free oil, gas and solid particles while within said entrance chamber;

conducting said fluid downstream of said crosswise flow through said passageway into an exit chamber, said fluid releasing additional free oil and solid particles while within said exit chamber.

20. The method of claim 18 further comprising the step of periodically flowing fluid from a plurality of fluid jets horizontally beneath said passageway to urge said solid particles into an outlet.

21. The method of claim 18 further comprising the steps of periodically conducting said solid particles along with some fluid as a slurry generally downwardly into a vessel;

flowing said slurry upwardly through a generally conical corrugated passageway, said flow being generally parallel to peaks and valleys within said generally conical corrugated passageway with said flow urging solid particles to separate from the slurry and flow downwardly along valleys of the generally conical corrugated passageway, said flow also urging oil to be released from the slurry and flow upwardly along peaks of the generally conical corrugated passageway;

said peaks and valleys each extending generally radially and upwardly at an angle of about 60° with respect to the horizontal;

periodically agitating said slurry within the vessel;

periodically removing solid particles from beneath said generally conical corrugated passageway;

periodically removing free oil from above said generally conical corrugated passageway; and periodically removing fluid which is relatively free of oil and relatively free of solid particles from about a periphery of the generally conical corrugated passageway; and periodically removing said slurry from said vessel.

22. The method of claim 21 further comprising the step of interrupting a vortex flow of the slurry before flowing through the generally conical corrugated passageway.

23. The method of claim 21 wherein the slurry is periodically agitated by flowing fluid from a plurality of sand cleaning eductors upwardly from beneath said generally conical corrugated passageway to assist in cleaning said solid particles.

24. A method for cleaning a fluid, especially produced water and collected deckdrainage in an off-shore facility for oil or gas production, comprising the steps of separating the fluid in a surge settler into a first portion which is relatively free of solid particles and a second portion which is relatively rich in solid particles;

removing oil from the first portion in a water washer and separating the first portion into a third portion which is relatively free of both oil and solid particles, and a fourth portion which is relatively rich in oil;

removing oil from the second portion in a solids cleaner, and separating said second portion into a fifth portion which is relatively rich in solid particles and free of oil and a sixth portion which is relatively free of solid particles;

removing oil from the fourth and sixth portions in a high efficiency skimmer, and supplying said cleaned fourth and sixth portions as a seventh portion which is relatively free of solid particles and oil;

removing oil in a skim pile from the third, fifth and seventh portions, and supplying an oil-rich eighth portion from said skim pile to said high efficiency skimmer which is rich in oil for oil removal thereby;

supplying fluid directly to the third, fifth and seventh portions for oil removal.

25. The method of claim 24 wherein said second portion flows vertically downwardly.

26. The method of claim 25 wherein said fifth portion flows vertically downwardly.

* * * * *